(12) United States Patent
Yuan et al.

(10) Patent No.: US 10,388,014 B2
(45) Date of Patent: Aug. 20, 2019

(54) VESSEL ANALYSIS IN MULTIPLEXED IMAGES

(71) Applicants: Ventana Medical Systems, Inc., Tucson, AZ (US); Hoffmann-La Roche, Inc., Little Falls, NJ (US)

(72) Inventors: Quan Yuan, San Jose, CA (US); Srinivas Chukka, San Jose, CA (US); Gerardo Fernandez, Chappaqua, NY (US); Elizabeth Little, San Jose, CA (US); Angelika Fuchs, Munich (DE)

(73) Assignees: Ventana Medical Systems, Inc., Tucson, AZ (US); Hoffmann-La Roche, Inc., Little Falls, NJ (US)

( * ) Notice: Subject to any disclaimer, the term of this patent is extended or adjusted under 35 U.S.C. 154(b) by 219 days.

(21) Appl. No.: 15/633,945

(22) Filed: Jun. 27, 2017

(65) Prior Publication Data

US 2017/0294017 A1  Oct. 12, 2017

Related U.S. Application Data

(63) Continuation of application No. PCT/US2015/000331, filed on Dec. 24, 2015.

(60) Provisional application No. 62/267,714, filed on Dec. 15, 2015, provisional application No. 62/097,419, filed on Dec. 29, 2014.

(51) Int. Cl.
*G06T 7/00* (2017.01)

(52) U.S. Cl.
CPC .. *G06T 7/0012* (2013.01); *G06T 2207/10056* (2013.01); *G06T 2207/20168* (2013.01); *G06T 2207/30101* (2013.01)

(58) Field of Classification Search
CPC ........ G06T 7/0012; G06T 2207/30101; G06T 2207/10056; G06T 2207/20168
USPC ......................................................... 382/128
See application file for complete search history.

(56) References Cited

U.S. PATENT DOCUMENTS

2014/0121512 A1    5/2014  Chen et al.

FOREIGN PATENT DOCUMENTS

WO    WO-02076282 A2 * 10/2002 ........... G06T 7/0012
WO       02076282 A3    11/2003

OTHER PUBLICATIONS

International Preliminary Report on Patentability dated Jul. 4, 2017 in corresponding PCT/US2015/000331 filed on Dec. 24, 2015, pp. 1-8.

(Continued)

*Primary Examiner* — Amandeep Saini
(74) *Attorney, Agent, or Firm* — Charney IP Law LLC; Thomas M. Finetti

(57) ABSTRACT

Systems and methods for analyzing vessels in multiplexed images include detecting large vessels using a spoke feature detection method, detecting long and narrow vessels using a line feature detection method, detecting smaller vessels using rolling-ball filtering and binary image operations to generate a mask, and evaluating any contour polygons resulting from these operations using quality measurements and other thresholds. Maturity determination and nuclei detection are also performed, resulting in an output of vessel characteristics and co-locations enabling enhanced analysis of multispectral images.

25 Claims, 16 Drawing Sheets

(56) References Cited

OTHER PUBLICATIONS

International Search Report and Written Opinion dated Apr. 5, 2016 in corresponding PCT/US2015/000331 filed on Dec. 24, 2015, pp. 1-15.
Kiwanuka, F.N. et al., Automatic Attribute Threshold Selection for Blood Vessel Enhancement, International Conference on Pattern Recognition, (2010), pp. 2314-2317, IEEE.
Lesage, D. et al., A review of 3D vessel lumen segmentation techniques: Models, features and extraction schemes, Medical Image Analysis, (2009), pp. 819-845, vol. 13 Issue 6.
M. Milagro Fernandez-Carrobles et al: "TMAV vessel Segmentation Based on Color and Morphological Features: Application to Angiogenesis Research", The Scientific World Journal, vol. 30, No. 1, Jan. 1, 2013 (Jan. 1, 2013), pp. 32-11,XP055257845, DOI: 10.1109/JBHI.2013.2282816 abstract; figure 1.
Mojodn et al: "Adaptive local thresholding by verification-basedmultithreshold probing with application to vessel detection in retinal images", IEEET Ransactionps A Tterann Alysaisn D Machininet Elligencieee, EC Omputer Societyu, SA, vol. 25, No. 1, Jan. 1, 2003 (Jan. 1, 2003), pp. 132-138, XP011095441, ISSN: 0162-8828 abstract section 4.1 Algorithm.
Reyes-Aldasoro, C.C. et al., An automatic algorithm for the segmentation and morphological analysis of microvessels in immunostained histological tumour sections, Journal of Microscopy, (2010), pp. 262-278, vol. 242.

\* cited by examiner

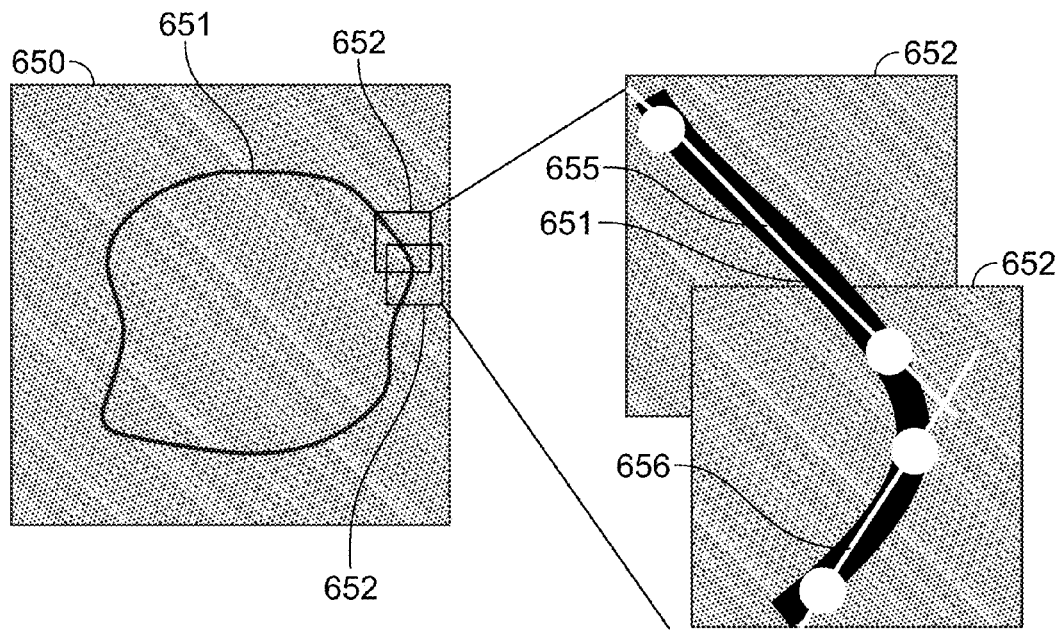
FIG. 6A
FIG. 6B
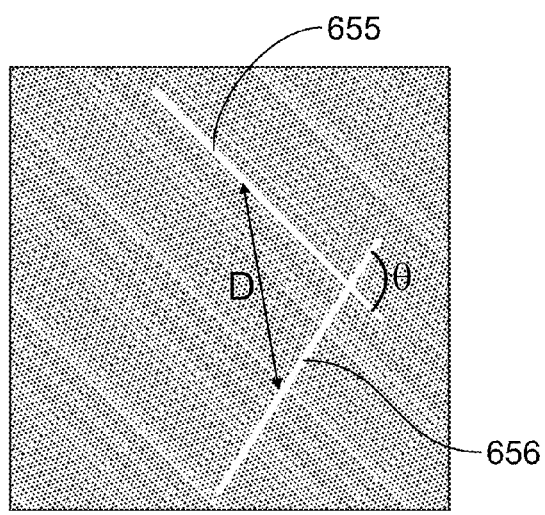
FIG. 6C

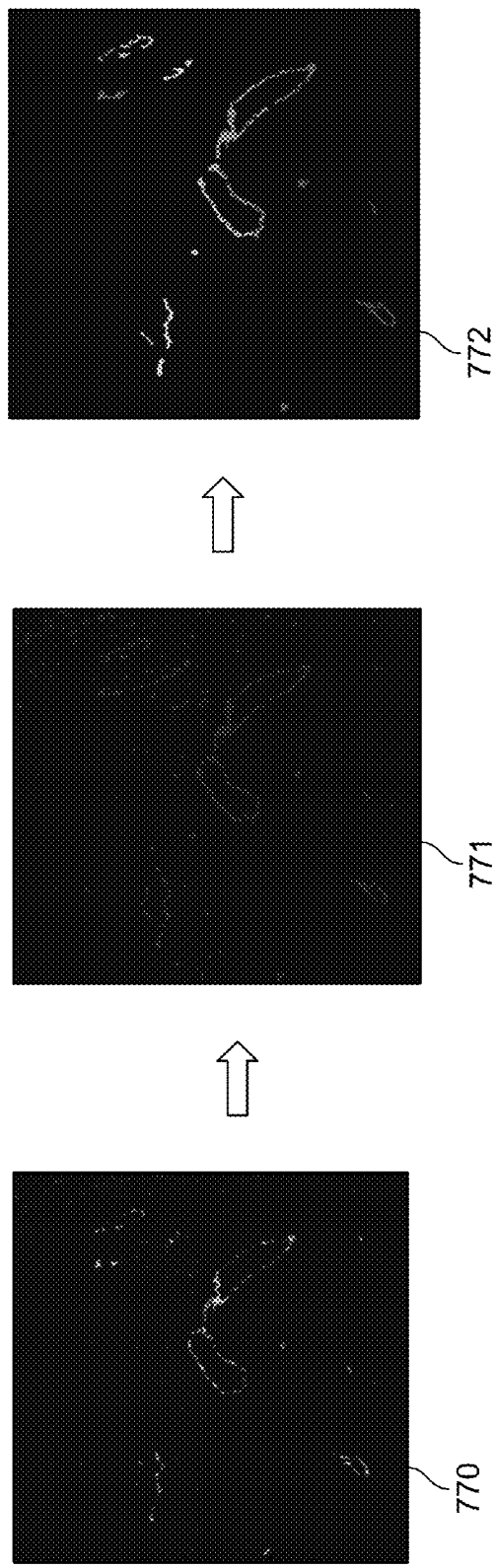
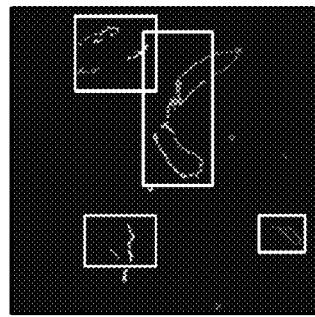
FIG. 7B

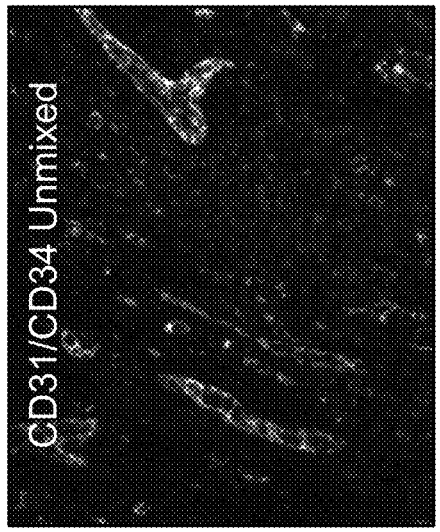
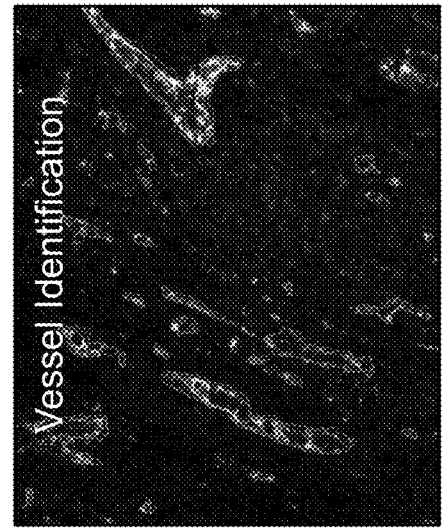
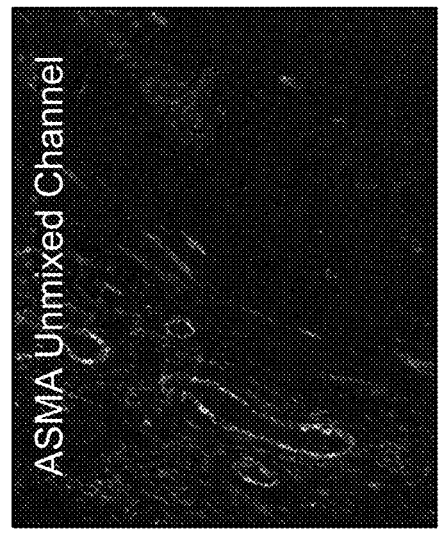
FIG. 12

VESSEL ANALYSIS IN MULTIPLEXED IMAGES

CROSS REFERENCE TO RELATED APPLICATIONS

This patent application is a continuation of International Patent Application No. PCT/US2015/000331 filed Dec. 24, 2015, which claims the benefit of the filing date of U.S. Provisional Patent Application 62/267,714, filed Dec. 15, 2015, and the benefit of the filing date of U.S. Provisional Patent Application 62/097,419 filed Dec. 29, 2014, the disclosures of which are hereby incorporated by reference in their entirety herein.

FIELD OF THE SUBJECT DISCLOSURE

The present disclosure provides systems and automated solutions for detecting and classifying vascular structures in multiplexed images.

BACKGROUND OF THE SUBJECT DISCLOSURE

Angiogenesis is the process whereby new blood vessels are formed. Angiogenesis, also called neovascularization, occurs normally during embryogenesis and development, and occurs in fully developed organisms during wound healing and placental development. In addition, angiogenesis occurs in various pathological conditions, including in ocular diseases such as diabetic retinopathy and macular degeneration due to neovascularization; in conditions associated with tissue inflammation, such as rheumatoid arthritis and inflammatory bowel disease; and in cancer, where blood vessel formation in the growing tumor provides oxygen and nutrients to the tumor cells, as well as providing a route via which tumor cells metastasize throughout the body.

In order to grow, a tumor must undergo an angiogenic switch. Vascular endothelial growth factor (VEGF) is required to induce this angiogenic switch. VEGF and the genes in the VEGF pathway are considered important mediators of cancer progression. Micro-vascularization in the tumor microenvironment may be reflective of the generation of new micro vessels induced by cancerous tissue to draw nutrients to support tumor growth. In addition, micro vessel density is indicative of tumor growth.

The importance of this pathway in cancer cell growth and metastasis has led to the development of anti-angiogenesis agents for use in cancer therapy. These therapies include, among others, bevacizumab, pegaptanib, sunitinib, sorafenib and vatalanib. Identification of patients that may respond to therapy with such agents is an important step in treating patients inflicted with cancer.

SUMMARY OF THE SUBJECT DISCLOSURE

In one aspect of the present disclosure is a computer device for vessel identification and classification comprising one or more processors and at least one memory, the at least one memory storing non-transitory computer-readable instructions for execution by the one or more processors to cause the one or more processors to: detect one or more vessels in each of a plurality of vessel channel images, wherein each of the one or more detected vessels may be a large vessel, a long and narrow vessel, or a small vessel; classify the detected one or more vessels as blood vessels or lymphatic vessels; and/or identify a maturity of each of the one or more detected vessels.

In some embodiments, the detection of large vessels comprises identifying lumens having low pixel intensity value inner regions surrounded by high pixel intensity value contours. In some embodiments, the identifying of lumens having low pixel intensity value inner regions surrounded by high pixel intensity value contours comprises evaluating contrasts between dark regions in the vessel channel images and comparatively lighter regions in the vessel channel images. In some embodiments, the detection of large vessels comprises determining a boundary of the identified lumen. In some embodiments, the boundary of the identified lumen is determined (a) by placing a spoke at an approximate center of the identified lumen, each spoke having a plurality of arms extending radially from a center of the spoke, (b) evaluating pixel intensities along each arm and pixel intensities at the spoke center, (c) retaining the spoke if it meets contrast threshold values (e.g. empirically determined contrast threshold values); and (d) generating a contour polygon based on the retained spoke (e.g. where the generated polygon approximates the boundaries of the identified lumen).

In some embodiments, the detection of long and narrow vessels comprises (i) detecting locally linear structures (e.g. lines) in a plurality of overlapping regions in a vessel channel image; and (ii) grouping together the detected local structures from the overlapping regions that meet an affinity threshold. In some embodiments, the grouping together of those detected locally linear structures from the overlapping regions that meet the affinity threshold comprises (i) calculating an affinity between two adjacent local structures in the overlapping region by evaluating a distance and an angle between the two adjacent local structures, and (ii) comparing the calculated affinity to the affinity threshold. In some embodiments, a contour polygon is generated from the grouped structures to geometrically represent vessels.

In some embodiments, the detection of small vessels comprises (i) generating a binary mask comprising pixels whose intensities are greater than surrounding background intensities; (ii) connecting pixels within the generated binary mask; and (iii) evaluating whether a size of the connected pixels meets a small vessel threshold size. In some embodiments, the generation of the binary mask comprises (a) selecting pixels among a plurality of pixels in a vessel channel image; (b) measuring a mean value of intensities of pixels surrounding each of the selected pixels; (c) subtracting the respective measured mean value of intensities of pixels surrounding the selected pixels from an intensity value of each of the respective selected pixels; (d) comparing the subtracted values to a background intensity threshold; and (e) adding those pixels whose subtracted value intensities exceed the background intensity to the binary mask. In some embodiments, the pixels within the generated binary mask are connected using a connected components labeling process. In some embodiments, a contour polygon is generated from the connected components.

In some embodiments, the classifying of the detected one or more vessels comprises identifying overlapping vessels in each of the plurality of vessel channel images. In some embodiments, those detected vessels that do not overlap are classified based on stain or biomarker signals in the vessel channel images. In some embodiments, instructions are provided for estimating a maturity of a detected vessel. In some embodiments, the estimating of the maturity of a detected vessel comprises evaluating a difference in mean pixel intensities between a generated inner ring and a generated outer ring placed around the detected vessel. In some embodiments, the generated inner and outer rings comprise pixels whose intensities correspond to signals of tissue stained with an anti-smooth muscle antibody. In some embodiments, instructions are provided for detecting nuclei.

In another aspect of the present disclosure is a computer implemented method for detecting and analyzing vessels comprising detecting one or more vessels in each of a plurality of vessel channel images, wherein each of the one or more detected vessels may be a large vessel, a long and narrow vessel, or a small vessel; classifying the detected one or more vessels as blood vessels or lymphatic vessels; and/or identifying a maturity of each of the one or more detected vessels.

In some embodiments, the detecting of large vessels comprises identifying lumens having low pixel intensity value inner regions surrounded by high pixel intensity value contours. In some embodiments, the identifying of lumens having low pixel intensity value inner regions surrounded by high pixel intensity value contours comprises evaluating contrasts between dark regions in the vessel channel images and comparatively lighter regions in the vessel channel images. In some embodiments, the detection of large vessels comprises determining a boundary of the identified lumen. In some embodiments, the boundary of the identified lumen is determined (a) by placing a spoke at an approximate center of the identified lumen, each spoke having a plurality of arms extending radially from a center of the spoke, (b) evaluating pixel intensities along each arm and pixel intensities at the spoke center, (c) retaining the spoke meeting contrast threshold values; and (d) generating a contour polygon based on the retained spoke.

In some embodiments, the detection of long and narrow vessels comprises (i) detecting local lines in a plurality of overlapping regions in the vessel channel images; and (ii) grouping together the detected local lines from the overlapping regions that meet an affinity threshold. In some embodiments, the grouping together of the detected local lines from the overlapping regions that meet the affinity threshold comprises (i) calculating an affinity between two adjacent local lines in the overlapping region by evaluating a distance and an angle between the two adjacent local lines, and (ii) comparing the calculated affinity to the affinity threshold. In some embodiments, a contour polygon is generated from the grouped lines.

In some embodiments, the detection of small vessels comprises (i) generating a binary mask comprising pixels whose intensities are greater than surrounding background intensities; (ii) connecting pixels within the generated binary mask; and (iii) evaluating whether a size of the connected pixels meets a small vessel threshold size. In some embodiments, the generation of the binary mask comprises (i) selecting pixels among a plurality of pixels; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing the subtracted values to a background intensity threshold; and (v) adding those pixels whose subtracted value intensities exceed the background intensity to the binary mask. In some embodiments, the pixels within the generated binary mask are connected using a connected components labeling process. In some embodiments, the connected components are used to generate a contour polygon.

In some embodiments, the classifying of the detected one or more vessels comprises identifying overlapping vessels in each of the plurality of vessel channel images. In some embodiments, those detected vessels that do not overlap are classified based on stain signals. In some embodiments, the method further comprises estimating a maturity of a detected vessel. In some embodiments, the estimating of the maturity of a detected vessel comprises evaluating a difference in mean pixel intensities between inner and outer rings placed around the detected vessel. In some embodiments, the inner and outer rings comprise pixels whose intensities correspond to signals of tissue stained with an anti-smooth muscle antibody. In some embodiments, the method further comprises detecting nuclei.

In another aspect of the present disclosure is a computer device for vessel identification and classification comprising one or more processors and at least one memory, the at least one memory storing non-transitory computer-readable instructions for execution by the one or more processors to cause the one or more processors to (i) execute instructions in at least one of a spoke feature detection module, a line feature detection module, and a small vessel detection module to detect one or more vessels each of a plurality of vessel channel images; (ii) execute instructions in a vessel classification module to classify the detected one or more vessels as blood vessels or lymphatic vessels; and/or (iii) execute instructions in a maturity determination module to determine a maturity of the one or more detected vessels. In some embodiments, the computer device further executes instructions in a nuclear detection module to identify cell nuclei.

In another aspect of the present disclosure is a specimen analyzer comprising (i) a computer device for vessel identification and classification comprising one or more processors and at least one memory, the at least one memory storing non-transitory computer-readable instructions for execution by the one or more processors to cause the one or more processors to: detect one or more vessels in each of a plurality of vessel channel images, wherein each of the one or more detected vessels may be a large vessel, a long and narrow vessel, or a small vessel; classify the detected one or more vessels as blood vessels or lymphatic vessels; and identify a maturity of each of the one or more detected vessels; and (ii) an imaging apparatus.

In another aspect of the present disclosure is a computer device for vessel identification and classification comprising one or more processors and at least one memory, the at least one memory storing non-transitory computer-readable instructions for execution by the one or more processors to cause the one or more processors to (i) associate a boundary of a lumen detected in an image with a first vessel type, the image comprising at least one vessel channel; and (ii) associate a plurality of locally linear structures observed in a corresponding plurality of regions of the image with a second vessel type; wherein the first vessel type represents vessels having a large diameter; and wherein the second vessel type represents long and narrow vessels.

In another aspect of the present disclosure is a computer device for vessel identification and classification comprising one or more processors and at least one memory, the at least one memory storing non-transitory computer-readable instructions for execution by the one or more processors to cause the one or more processors to generate a first polygon representative of a first vessel detected in a blood vessel channel image derived from a multiplexed image; generate a second polygon representative of a second vessel detected in a lymphatic vessel channel image derived from the multiplexed image; and combine the blood vessel channel image and the lymphatic vessel channel image; wherein upon determining that the first generated polygon overlaps the second generated polygon by an overlap threshold factor, classifying both the first and second generated polygons as a lymphatic vessel; and wherein upon determining that the first generated polygon does not overlap the second generated polygon by an overlap threshold factor, classifying the first generated polygon as a blood vessel and the second generated polygon as a purely lymphatic vessel.

In another aspect of the present disclosure is a computer device for vessel identification and classification comprising one or more processors and at least one memory, the at least one memory storing non-transitory computer-readable instructions for execution by the one or more processors to cause the one or more processors to detect one or more large vessels in a vessel channel of an image based on a spoke placed within a vessel lumen; detect one or more narrow vessels in the vessel channel based on a grouping of a plurality of adjacent lines in the image; and detect one or more small vessels based on a binary mask applied to the image.

In another aspect of the present disclosure is a computer implemented method for vessel identification comprising: analyzing each of a plurality of digital images of a tissue sample for identifying vessels of at least one of three different types, the first type, referred to as large vessels, comprising vessels forming the secondary arterial tree structures and capillary vessels; the second type, referred to as long and narrow vessels, comprising blood capillaries or newly formed vessels, the third type, referred to as small vessels, comprising mature arteries and veins; analyzing the identified vessels for classifying the identified vessels as blood vessels or lymphatic vessels; and identify a maturity of each of the one or more detected vessels. In some embodiments, the detection of vessels of the first type comprises: evaluating intensity contrasts of one or more of the plurality of digital images for identifying lumen pixel regions and boundary pixel regions fulfilling the condition that: the lumen pixel region is a pixel region whose pixel intensities are below the pixel intensities of the boundary regions, the lumen and the boundary pixel regions lying in the same or in different ones of the plurality of digital images, the lumen pixel region being surrounded by the boundary pixel region, returning an identified lumen pixel region surrounded by a boundary pixel region as an identified large vessel.

In some embodiments, the detection of the boundary of the identified lumen is determined by: (a) by placing a spoke at an approximate center of the identified lumen, each spoke having a plurality of arms extending radially from a center of the spoke, (b) evaluating pixel intensities along each arm and pixel intensities at the spoke center, (c) retaining the spoke selectively in case it meets contrast threshold values; and (d) generating a contour polygon from the retained spoke. In some embodiments, the retaining of the spoke meeting contrast threshold values comprises, for at least one of the digital images: identify the intensity value of the spoke center; identify the median of the maximum intensity values from all the arms and the spoke center intensity value; identify the median of the minimum intensity values from all the arms and the spoke center intensity value; determining i) if the median of all maximum intensity values is at least a first threshold (T1) greater than the intensity value at the spoke center; determining ii) if the median of all minimum intensity values is at most a second threshold (T2) less than the intensity value at the spoke center; and selectively in case the determination i) and ii) returns true, retaining and using the spoke for generating the contour polygon.

In some embodiments, the spoke for generating the contour polygon comprises: in each of the arms of the spoke, identifying the pixel having the highest intensity value; and connecting the identified pixels to form the polygon.

In some embodiments, the detection of vessels of the second type comprises: (i) detecting line sections in a plurality of overlapping regions in at least one of the digital images; and (ii) grouping together the detected line sections from the overlapping image regions that meet an affinity threshold in respect to each other, the grouping being preferentially performed in an agglomerative clustering procedure; and (iii) returning the grouped lines as a detected vessel of the second type. In some embodiments, the grouping comprises: (i) calculating an affinity between two adjacent line sections in the overlapping region by evaluating a distance and an angle between the two adjacent line sections, and (ii) comparing the calculated affinity to an affinity threshold for selectively grouping the ones of the line sections into one group whose affinity to each other exceeds the affinity threshold. In some embodiments, the method further comprises generating a contour polygon from the grouped line segments.

In some embodiments, the method further comprises identifying the entropy of pixels contained in the identified vessel of the second type; comparing the determined entropy with an entropy threshold and discarding the identified vessel of the second vessel type in case the determined entropy is higher than the entropy threshold; or identifying the average intensity of pixels contained in an image area lying farther away from the identified vessel than a distance threshold; comparing the determined average intensity with an intensity threshold and discarding the identified vessel of the second vessel type in case the determined average intensity is higher than the intensity threshold.

In some embodiments, the detection of vessels of the third type comprises (i) generating a binary mask comprising pixels whose intensities are greater than surrounding background pixel intensities; (ii) connecting pixels within the generated binary mask; and (iii) evaluating whether a size of the connected pixels meets a small vessel threshold size.

In some embodiments, the generation of the binary mask comprises, for at least one of the digital images: (i) selecting pixels among a plurality of pixels in the at least one digital image; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing the subtracted values to a background intensity threshold; and (v) adding those pixels whose subtracted value intensities exceed the background intensity threshold to the binary mask. In some embodiments, the pixels within the generated binary mask are connected using a connected components labeling process. In some embodiments, the classifying of the detected one or more vessels comprises: identifying overlapping vessels in each of the plurality of vessel channel images, analyzing pixel intensity values of detected vessels that do not overlap for classifying the vessel as blood vessel or lymphatic vessel, the pixel intensities correlating with the staining intensity of a stain that selectively stains a biomarker being specific for either blood vessels or lymphatic vessels.

In some embodiments, the identification of the maturity of each of the one or more detected vessels comprises: overlaying each identified vessel with a concentric ring structure comprising an inner and an outer ring, the inner ring being adjacent to the outer ring, the inner ring being an inner ring of a circle having the expected radius of a mature vessel, the outer ring being an outer ring of said circle; mapping the concentric ring structure to one of the digital images, the pixel intensities of said one digital image correlating with the staining intensity of a stain that selectively stains a biomarker being specific for smooth-muscle tissue; identifying the mean intensity values of pixels in the mapped inner ring in the one digital image; identifying the mean intensity values of pixels in the mapped outer ring in the one digital image; determining a difference in mean pixel intensity values between the inner and outer rings; and where the determined difference exceeds a vessel maturity threshold, returning that said vessel is mature.

In general, the objective of image analysis algorithms for vessel detection, such as in cancer tissue slides, is to detect blood vessel structures and classify them into the categories of macro-vessels, lymphatic vessels and micro-vessels. In a multiplexed image, image appearance of both macro- and micro vessels may be quite varying (e.g. far from their expected ideal appearance) and thus challenging for automated detection and classification. In some tissue slide images, some macro-vessel lumens may appear to be too large, or the cellular boundaries may be broken and/or incomplete. Additionally, irregular shapes, particularly for large vessels, make it difficult to find suitable models to compare with and thus classify the vessels. Similarly, micro-vessels may be occluded by surrounding connective tissue and/or other cellular structures. In addition, micro-vessels may not have a well formed closed shape or possess an enclosed lumen interior. Vessel detection methods commonly available in the existing literature are primarily designed to either identify regular shapes, such as elliptical shapes, of a certain size. Alternatively, prior art methods may rely on identifying the lumen structures, such as white empty spaces or those filled with distinctly colored blood cells, and then assigning the lumen boundary as blood vessels. These methods are often found to be inadequate to handle the vascular appearance variability in the images and are prone to errors in detecting and classifying the macro and micro vessels structures. The present disclosure takes into account vessel appearance variability and identifies large vessels, long and narrow vessels and small vessels and further classifies the identified vessels as blood vessels or lymphatic vessels. Applicants have therefore developed a superior method of detecting and classifying vessels, and further for estimating a maturity of such detected and/or classified vessels. Such a maturity determination, in addition to the other data derived herein, may allow for superior treatment, such as with the administration of an appropriate anti-angiogenesis agent.

BRIEF DESCRIPTION OF THE DRAWINGS

FIGS. 6A-6C illustrate a line feature detection method, according to an exemplary embodiment of the present subject disclosure.

FIG. 7B further illustrates a workflow for small vessel segmentation.

FIG. 12 provides a vessel detection workflow, where the vessel and the ASMA (smooth muscle) unmixed channels are shown along the identified vessels overlaid on the raw image capture.

DETAILED DESCRIPTION OF THE SUBJECT DISCLOSURE

Figure 1A:
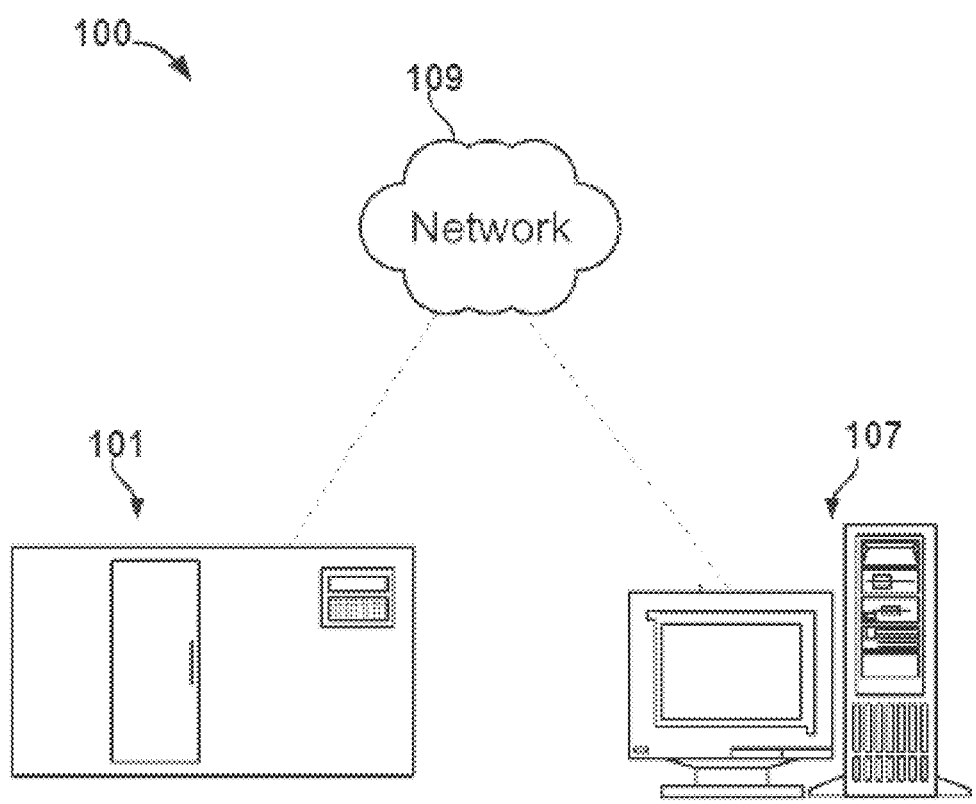
FIG. 1A illustrates a system for vessel analysis in multiplexed images, including a computer and an imaging apparatus.

The present disclosure is directed to methods of identifying and analyzing vessels in multiplexed images. Embodiments disclosed herein describe (i) the detection of vessels, namely the identification of large vessels, long and narrow vessels, and small vessels; (ii) the classification of the identified vessels as blood vessels or lymphatic vessels; and/or (iii) the analysis of a maturity of each of the detected and/or classified vessels. In some embodiments, cells or nuclei are also detected and, when combined with the identification, classification, and analysis of the vessels, allows for co-localization of cells/nuclei and vessels.

Vascular structures in a tissue slide may be classified as provided herein and as described by Less et al. "Microvascular Architecture in a Mammary Carcinoma: Branching Patterns and Vessel Dimensions," Cancer Research, 51, 265-273, Jan. 1, 1991, the disclosure of which is hereby incorporated herein by reference.

Large vessels, also called as "macro vessels," may include mature arteries and veins. Large vessels appear in tissue slides or images derived from tissue samples as having a well structured elliptical, curvilinear structure having a linear cellular boundary outline enclosing white lumen regions, and further having a thick and mature protective muscle layer around them. Typically, large vessels, which constitute the mature arteries and veins, have an average diameter ranging from about 1 to about 2 cm, with a wall thickness of about 1 mm.

Long and narrow vessels, which form the secondary arterial tree structures and capillary vessels, have average diameters ranging from about 50 microns to about 20 microns, with a fairly thin muscle outline of about 1 micron.

Micro-vessels are either small blood capillaries or newly formed vessels having thin smooth muscle around them. The micro vessels, which may constitute the newly forming vascular structures within the tumor microenvironment, have an average diameter ranging from about 8 to 12 microns, with minimal smooth muscle surrounding them.

A "vessel channel image" is, for example, a digital image whose pixel intensity values are indicative of the amount of a stain bound to a vessel or part thereof. The stain used for some image channels may be, for example, specific for specific regions within or in spatial proximity of a vessel, e.g. muscular regions which might surround a vessel. The stain may be specific for a particular biomarker being indicative of the maturity state of a vessel or the vessel type.

A "blood vessel channel image" is, for example, a digital image whose pixel intensity values are indicative of the amount of stain selectively bound to a blood vessel or part thereof.

A "lymphatic vessel channel image" is, for example, a digital image whose pixel intensity values are indicative of the amount of stain selectively bound to a lymphatic vessel or part thereof.

A "signature" of a tissue structure, e.g. a "signature of a smooth muscle outline" as used herein is, for example, a spectral signature derived from one or more different dyes which may spectrally overlap. In a cell where multiple biomarkers are co-localized, and are thus co-expressive, the fluorescent emission from the individual biomarkers may add up with a mixing contribution (weight) that is proportional to and characteristic for the expression of the associated biomarker(s).

A "local line feature" or "line segment" as used herein is, for example, a set of pixels within a sub-region (e.g. a region of N×N pixels) of a digital image that have an intensity distribution that indicates that said pixels are likely part of a line (that may span multiple sub-regions).

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

A "multi-channel image," "multiplex image," or "multiplexed image" as used herein encompasses a digital image obtained from a biological tissue sample in which different biological structures, such as blood vessels, lymphatic vessels, and muscle tissue, are simultaneously stained with specific stains, fluorescent dyes, quantum dots, chromogens, etc. (or any combination thereof), each of which fluoresces or are otherwise detectable in a different spectral band thus constituting one of the channels of the multi-channel image.

"Multiplex," "multiplexed," or "multiplexing" refers to detecting multiple targets in a sample concurrently, substantially simultaneously, or sequentially. Multiplexing can include identifying and/or quantifying multiple distinct nucleic acids (e.g., DNA, RNA, mRNA, miRNA) and polypeptides (e.g., proteins) both individually and in any and all combinations.

A "tissue sample" as used herein is any biological sample that is obtained from a human or animal body for anatomic pathology. For example, a tissue sample may be derived from breast tissue, lung tissue, prostate tissue, etc. and may comprise samples derived from tumors, suspected tumors, or from healthy tissue. Other examples of tissue samples and specimens are their preparation are disclosed herein. The tissue sample may be treated in an assay with one or more stains to assist in the identification of structures (e.g. vessels, cells, etc.) within the sample.

An "unmixed image" as used herein encompasses a grey-value or scalar image obtained for one channel of a multi-channel image. By unmixing a multi-channel image one unmixed image per channel is obtained.

A computer-based device for detecting and/or analyzing vessels in a multiplex image is shown in FIG. 1A. The skilled artisan will appreciate that other computer devices or systems may be utilized and that the computer systems described herein may be communicatively coupled to additional components, e.g. specimen analyzers, scanners or imaging systems, automated slide preparation equipment, etc. Some of these additional components and the various computers that may be utilized are described further herein.

In general, the imaging apparatus 101 (or image source) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system, as known to those of ordinary skill in the art. Imaging systems are described further herein.

Figure 1B:
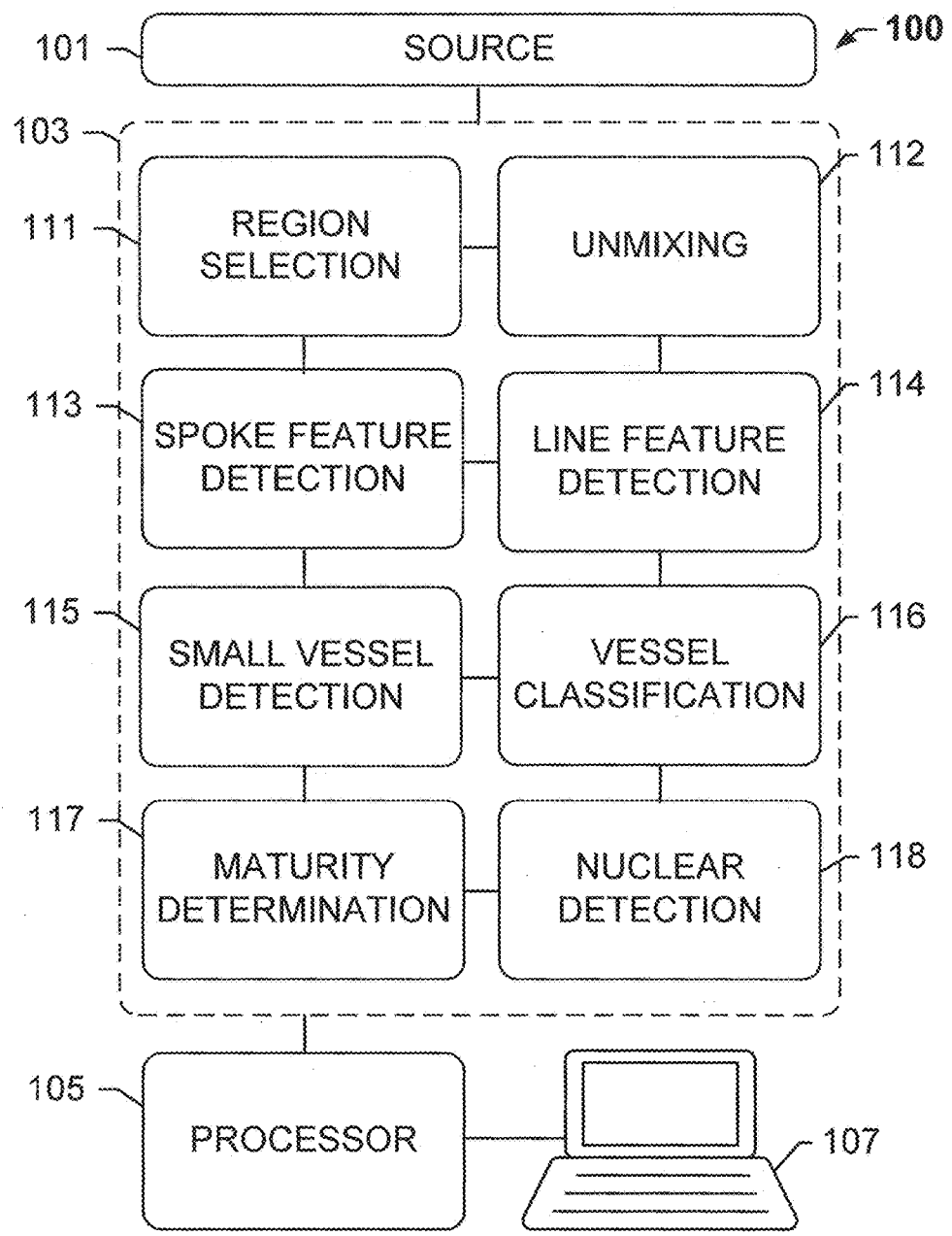
FIG. 1B illustrates a system for vessel analysis in multiplexed images, according to an exemplary embodiment of the present subject disclosure.

With reference to FIGS. 1A and 1B, the computer system 107 can include a desktop computer, a laptop computer, a tablet, or the like, digital electronic circuitry, firmware, hardware, memory 103, a computer storage medium 103, a computer program, a processor (including a programmed processor 105), and/or the like. The illustrated computing system 107 of FIG. 1A is a computer with a screen or display device and a tower. The tower can store digital images in binary form. The images can also be divided into a matrix of pixels. The pixels can include a digital value of one or more bits, defined by the bit depth. The network 109 or a direct connection interconnects the imaging apparatus 101 and the computer system 107. The network 109 may include, without limitation, one or more gateways, routers, bridges, combinations thereof, or the like. The network 109 may include one or more servers and one or more websites that are accessible to users and can be used to send and receive information that the computer system 107 can utilize. A server may include, without limitation, one or more associated databases for storing information (e.g., digital images, algorithms, staining protocols, cutoff values for comparative evaluations, or the like). The network 109 can include, but is not limited to, data networks using the Transmission Control Protocol (TCP), User Datagram Protocol (UDP), Internet Protocol (IP) and other data protocols. In some embodiments, the computer device or system further comprises a display output or other means of providing data/output to a user, operator, or downstream instrument or process.

Figure 2:
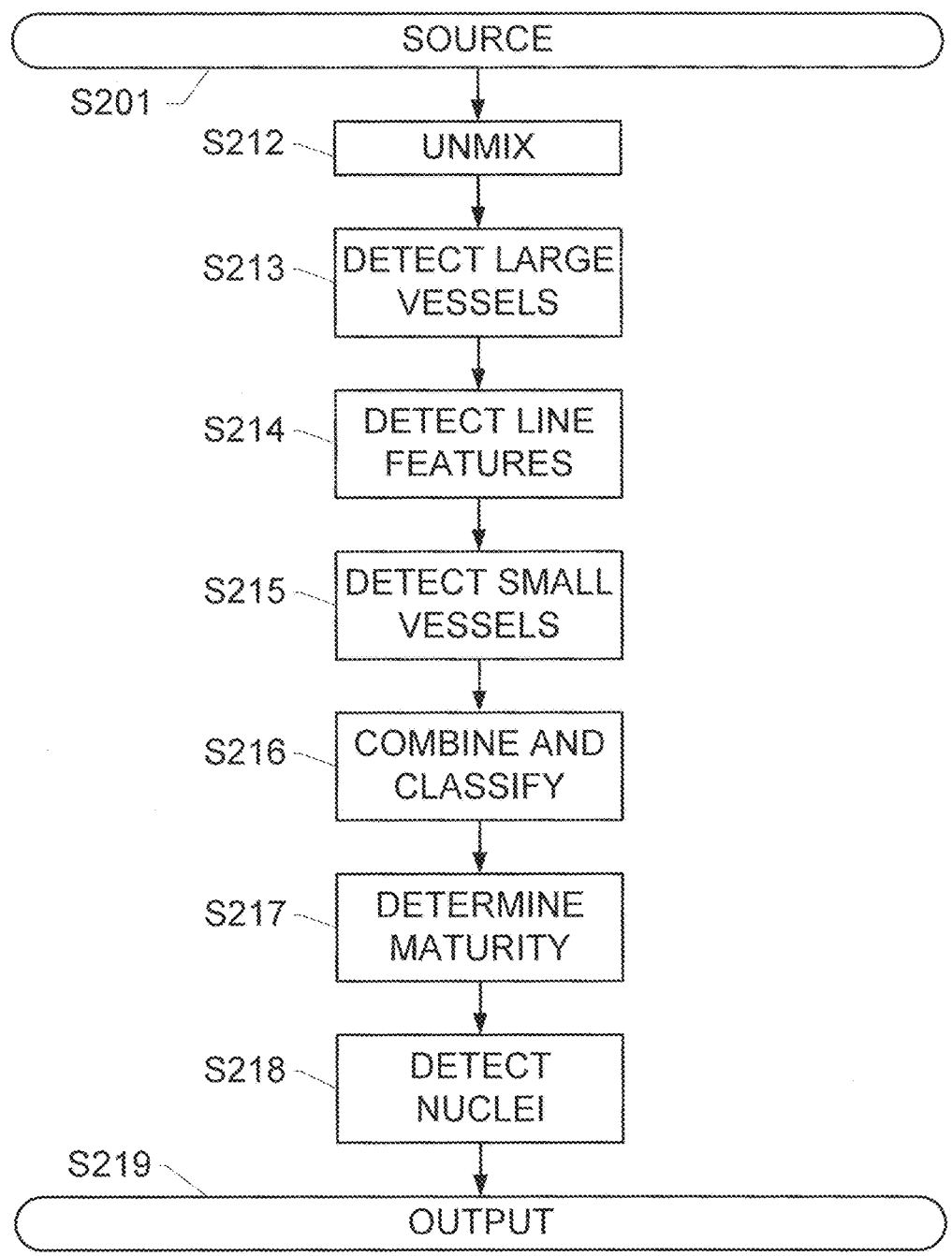
FIG. 2 illustrates a method for vessel analysis, according to an exemplary embodiment of the present subject disclosure.

With reference to FIGS. 1B and 2, the computer device or system 107 (or computer-implemented method) comprises one or more processors 105 and at least one memory 103, the at least one memory 103 storing non-transitory computer-readable instructions for execution by the one or more processors to cause the one or more processors to execute instructions to receive input images 101 from a source, run a region selection module 111 to enable automated or manual delineation of the input image into one or more regions, run an unmixing module 112 to unmix a multiplex image into a plurality of channel (e.g. vessel channel images) (S212), run a spoke detection module 113 to detect large vessels in each of a plurality of vessel channel images (S213), run a line feature detection module 114 to detect long and/or narrow vessels in each of the plurality of vessel channel images (S214), run a small vessel detection module 115 to detect smaller vessels in each of the plurality of vessel channel images (S215), run a vessel classification module 116 to classify each of the large, long/narrow, and/or small vessels identified as blood vessels, lymphatic vessels, or purely lymphatic vessels (S216), run a maturity determination module 117 to determine those classified vessels that are mature (S217), and run a nuclear detection module 118 to detect cells and/or nuclei in each of the plurality of vessel channel images (S218). Each of these modules is described in greater detail herein. Additional modules may be incorporated in the workflow in some embodiments. Of course, the skilled artisan will recognize that any of the instructions, algorithms, and filters described for use within each module may be adapted or changed based on the stains being detected.

Results of modules 111-118 (and steps S213 through S218, of FIG. 2) may be output to a user or operator of terminal 107, or may be compiled in a report generated by processor 105 and transmitted to another computer across a network, or saved in a file. The results include the outputs of each module 111-118 (and steps S213-S218) may and include details such as vessel locations, vessel shapes, polygon contours, lumen sizes, vessel categories and types, maturities, densities, nuclear locations and types, and spatial relations between each of these features, for enabling detailed further analysis of co-location between vessels and cells. Moreover, the operations described with reference to FIGS. 1B and 2 may be performed in any conceivable order, and are not limited to the order shown herein. For instance, several operations such as vessel detection (e.g. detect large, long and narrow, and small vessels in parallel operations) and nuclear detection may be performed in parallel, followed by maturity detection.

Moreover, the disclosed operations may be performed on the same or different regions of the image, or the entire image repeatedly, with custom regions being defined based on structures or features observed in the image, and separate operations being executed in parallel on different regions, enabling efficient processing of large numbers of multiplex fluorescent slides.

Input Images

In some embodiments, multiplex images 101 are acquired according to methods known to those of ordinary skill in the art and as described herein. The multiplex images 101 are derived from tissue samples, where the tissue samples have been stained, such as with one or more quantum dots, fluorophores, enzyme-deposited fluorophores or chromogenic stains, or any combination thereof.

To analyze and quantify cancer vascularization or microvascularization, the tissue samples may be stained with fluorescent assays that include one or more specific biomarkers for blood vessels, lymphatic vessels, and smooth muscles. In addition, the tissue may also be stained for different types of nuclei and/or cell membrane tumor biomarkers, along with a marker such as DAPI to identify nuclear structures. Methods for staining tissue structure and guidance in the choice of stains appropriate for various purposes are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)," the disclosures of which are incorporated herein by reference.

In some embodiments, such as in a multiplex fluorescent slide of a tissue specimen, different nuclei and tissue structures are simultaneously stained with specific fluorescent dyes, each of which fluoresces in a different spectral band (by way of example, typical fluorescent dyes include Alexa Fluor® dyes available from Fisher Scientific).

In other embodiments, the stains are selected from quantum dots. Nanocrystalline quantum dots are semiconductor nanocrystalline particles and typically range from about 2 to about 10 nm in size. A variety of quantum dots having various surface chemistries and fluorescence characteristics are commercially available from Invitrogen Corporation, Eugene, Oreg., or Invitrogen Nanocrystal Technologies, Hayward, Calif. (see, for example, U.S. Pat. Nos. 6,815,064, 6,682596 and 6,649,138, each of which patents is incorporated by reference herein). Yet other commercially available quantum dots include those provided under brand name Qdot™ from Life Technologies, Inc. Exemplary working embodiments utilize quantum dots, such as Qdot™ 565 and Qdot™ 655 nanocrystals, where the number used in such nomenclature refers to the approximate wavelength of the nanoparticle's emission maximum. For example, a Qdot™ 565 nanocrystal emits light having a wavelength of 565 nm and produces a light-green color. Thus, quantum dots can be selected to provide a detectable signal at a particular wavelength.

In some embodiments, the multiplex images comprise signals 101 (and S201) corresponding to stains specific for different vessel types. In other embodiments, the multiplex images comprise signals corresponding to stains specific for blood vessels and/or lymphatic vessels. In other embodiments, the multiplex images comprise signals corresponding to stains specific for endothelial cells (e.g. CD31) and/or lymphatic cells. In yet other embodiments, the multiplex images comprise signals corresponding to stains specific for muscle tissue or muscle cells. In some embodiments, stains are chosen such that vessel lumens may be detected by comparing darkly stained regions to comparatively lighter stained regions.

In some embodiments, the multiplex image comprises signals corresponding to stains specific for blood vessels, such as CD31/34, which has a narrow-band fluorescent emission centered at about 655 nm. In other embodiments, the multiplex image comprises signals corresponding to stains specific for lymphatic vessels, such as podoplanin, which has a narrow band fluorescent emission centered at about 565 nm. In yet other embodiments, the multiplex image comprises signals corresponding to an anti-smooth muscle antibody (ASMA) stain. In yet other embodiments, the multiplex image comprises signals corresponding to stains identifying other cells types or nuclei. In other embodiments, the multiplex image comprises signals corresponding to 4',6-Diamidino-2-phenylindole (DAPI) to stain all the nuclei in the image and any noisy background tissue autofluorescence that is present in multiplexed images. It is believed that the DAPI stained nuclei provide a tissue and cellular context to interpret the images.

Region Selection Module

Prior to unmixing (S212), the optional region selection module 111 enables automated or manual delineation of the multiplex image 101 into one or more regions. This enables subsequent operations to be performed on the same or different regions of the image, enabling efficient processing of multiplex images. For instance, a grid may be imposed over an image, and structures within a distance of one or more grid vertices may be sampled. Custom regions may be defined based on structures or features observed in the image, with separate processes being executed in parallel for each region. The custom regions may be automatically determined based on image analysis, tissue heterogeneity, etc., or may be selected by the user. For instance, a brightfield image of the specimen, such as an haematoxylin and eosin image, may be viewed and used to annotate specific regions, such as tumor areas. The identified areas may be used to provide a field of view for a fluorescent scanner. In other words, a region selected on a brightfield image may be scanned in further detail by source 101 to generate a multiplex fluorescent image of the selected region(s). Separate operations may be executed in parallel on different regions, enabling efficient processing of large numbers of multiplex slides, for example, fluorescent slides.

Unmixing of Multiplexed Images

As an initial step, the computer system receives a multiplexed image as input (S201), where the multiplexed image comprises signals corresponding one or more stain channels as described herein. Prior to further processing and analysis, this initial image must first be unmixed into its constituent channels (S212), where each unmixed channel corresponds to a particular stain or signal. The unmixed images are hereinafter referred to as "channel images" and may be used as the input for each of the vessel detection and nuclear detection modules described herein.

By way of background, each fluorescent dye emits with a distinct spectral signature in the visible spectral band from about 400 nm to about 780 nm, where the associated signal strength that gets emitted from a location on the tissue is linearly proportional to the biomarker expression of the underlying cellular structure. Although distinct from each other, the spectral signatures of different fluorescent dyes can spectrally overlap. In a cell where multiple biomarkers are co-localized, and are thus co-expressive, the fluorescent emission from the individual biomarkers may add up with a mixing contribution (weight) that is proportional to the associated biomarker expression. For example, one fluorescent dye may be emitting in the spectral range from about 480 to about 520 nm, while another fluorescent dye may emit in the spectral range from about 500 to about 540 nm. In addition, multiplex tissue slides may autofluoresce, which is a tissue emission background signal that is not associated with any particular biomarker expression, and which contributes a "noisy" component in the mixed signal. As an example, the autofluorescence noisy emission may be in the broadband spectral range of between about 400 nm to about 650 nm. The spectral signal observed at any given location in the tissue is a weighted mixture of the spectral emissions from the underlying co-expressive biomarkers and undesired noisy background spectral emissions.

In some embodiments, the fluorescent multiplex tissue slide is imaged using a multi-spectral imaging system, such as a fluorescent microscope system that is coupled to a camera or to a whole slide scanner, such that multiple channel images are acquired. In a typical multiplex system, sixteen to thirty channels images are acquired. Each acquired channel image is a measurement of the tissue slide signal that is being emitted in a particular narrow-band spectral filter range. As an example, a channel image that corresponds to a spectral filter range of about 500 to about 540 nm captures all the signal that are being emitted by the tissue in the about 500 nm to about 540 nm spectral range.

The multi-spectral image stack produced by the imaging system is a weighted mixture of the underlying fluorescent emission spectral signatures associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel and the unknown autofluorescence contribution. The spectral unmixing methods disclosed herein decompose the multi-channel pixel value vector at each and every pixel into a collection of constituent biomarker end members or components and estimate the proportions of the individual constituent fluorescent dyes for each of the biomarkers. For example, with a multispectral system with sixteen channels imaging a tissue slide of five biomarkers, the acquired multi-channel vector of pixel values at a pixel will be of vector of 16 values and the number of unmixing components to be solved for are six, with five corresponding to each biomarker and one to the background autofluorescent component. At each pixel location, the spectral unmixing method estimates the six component weights from the acquired 16-pixel vector. Accurate spectral unmixing of fluorescent images is believed to be clinically important because it is one of the key first steps in multiplex histopathology image analysis.

Methods of unmixing are well known to those of ordinary skill in the art and any method now known or later discovered may be used to "unmix" multiplex images into the vessel channel images. In general, the unmixing process extracts stain-specific channels to determine local concentrations of individual stains using reference spectra that are well known for standard types of tissue and stain combinations. For example, each pixel in an input image may comprise a mixture of component spectra including one or more quantum dots representing target structures, in addition to broadband signals such as DAPI and autofluorescence, as described above. The unmixing may use reference spectra retrieved from a control image or estimated from the image under observation. Unmixing the component signals of each input pixel enables retrieval and analysis of stain-specific channels, such as vessel channels and nuclei channels. The terms "unmixing" and "color deconvolution" (or "deconvolution") or the like (e.g. "deconvolving," "unmixed") are used interchangeably in the art.

In some embodiments, the multiplex images are unmixed using liner unmixing. Linear unmixing is described, for example, in 'Zimmermann "Spectral Imaging and Linear Unmixing in Light Microscopy" Adv Biochem Engin/Biotechnol (2005) 95:245-265' and in C. L. Lawson and R. J.

Hanson, "Solving least squares Problems", PrenticeHall, 1974, Chapter 23, p. 161,' the disclosures of which are incorporated herein by reference in their entirety. In linear stain unmixing, the measured spectrum (S(λ)) at any pixel is considered a linear mixture of stain spectral components and equals the sum of the proportions or weights (A) of each individual fluorophore reference spectral signature (R(λ)) that is being expressed at the pixel $$S(\lambda)=A1 \cdot R1(\lambda)+A2 \cdot R2(\lambda)+A3 \cdot R3(\lambda) \ldots Ai \cdot Ri(\lambda)$$

which can be more generally expressed as in matrix form as $$S(\lambda)=\Sigma Ai \cdot Ri(\lambda) \text{ or } S=R \cdot A$$

If there are M channels images acquired and N individual fluorophores, the columns of the M×N matrix R is the known reference spectral signature of the individual fluorophores and the N×1 vector A is the unknown of the proportions of individual fluorophores and the M×1 vector S is the measured multichannel spectral vector at a pixel. In these equations, the signal in each pixel (S) is measured during acquisition of the multiplex image and the reference spectra for the known stains are usually determined in an independent offline method from fluorescent specimens labeled with only a single stain using identical instrument settings. It becomes a simple linear algebra matrix exercise to determine the contributions of various stains (Ai) by calculating their contribution to each point in the measured spectrum. In some embodiments, the solution is obtained using an inverse least squares fitting approach that minimizes the square difference between the measured and calculated spectra by solving the following set of equations, $$[\partial \Sigma j\{S(\lambda j)-\Sigma i Ai \cdot Ri(\lambda j)\}2]/\partial Ai=0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

Detection of Vessels

After the unmixing of the multiplex image (S212), vessels are detected (steps S213, S214, S215) in each of a plurality of vessel channel images. In general, three different types of vessels may be detected, including large vessels, long and narrow vessels, and small vessels. For the detection of large vessels, a spoke feature detection module 113 is used to detect "basin" like regions which have smooth low pixel intensity value inner regions surrounded by high pixel intensity value contours. For the detection of long and narrow vessels, a line detection module 114 is used to identify local parts of long vessels and then group them together by agglomerative clustering (described more fully herein). For the detection of small vessels, a small vessel detection module 115 utilizes rolling-ball filtering and binary image operations to identify small and/or compact vessels. Each of these modules and processes are described in detail herein. Of course, the skilled artisan will recognize that not all types of vessels will be present in all tissue samples, or any regions thereof.

Vessels are identified in blood vessel channel images and lymphatic vessel channel images. In the vessel channel images, ideally there is a corresponding high pixel intensity that is in proportion to the underlying vessel stain contributions. On the other hand, in locations where there is no vessel present, there are very low pixel intensity values that corresponds to the background average value. For example, in the blood vessel channels, the blood vessel along with the lymphatic vessels show up as bright contours (due to the stains utilized); while in the lymphatic vessel channels, only the lymphatic vessel boundaries show up as bright contours (again, due to the stains utilized).

Following identification of the vessels in each of the plurality of vessel channel images, the outputs of each of the above-identified modules are provided to a vessel classification module 116 to classify the one or more detected vessels as blood vessels or lymphatic vessels; or to a maturity determination module 117.

Detection of Large Vessels

After the multiplex image is received as input (S201) and the image is unmixed into the plurality of vessel channel images (S212), large vessels are detected in each of the vessel channel images using a spoke feature detection module 113. In some embodiments, the spoke feature detection module 113 outputs a contour polygon that is provided to the vessel classification module 116 for further analysis. In general, the spoke feature detection module identifies large vessels in each of the vessel channel images by detecting basin-like regions having smooth, low-intensity inner regions surrounded by high value contours.

Figure 3:
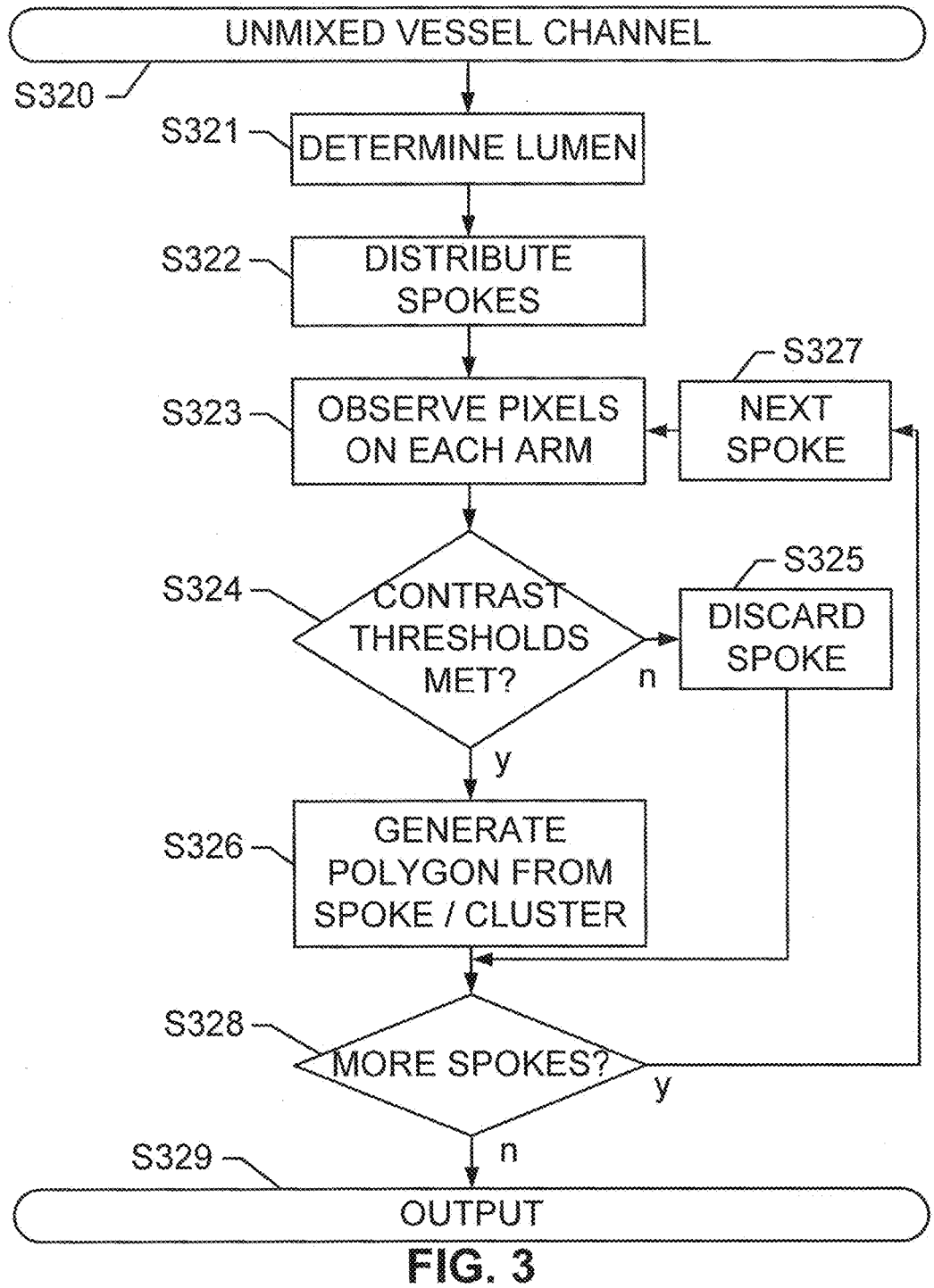
FIG. 3 illustrates a method for detecting large vessels, according to an exemplary embodiment of the present subject disclosure.

More specifically, and with regard to FIG. 3, one or more lumens may be detected (S321) in each of the vessel channel images by identifying contrasts between dark regions of the image and lighter regions surrounding the dark regions (or comparatively lighter regions). The identified contrasts may be evaluated against predetermined contrast thresholds between the vessel boundaries and the background signal in the unmixed vessel channel images. In some embodiments, the presence and location of lumens may be identified by observing the unmixed stain image associated with an anti-smooth muscle antibody (ASMA), where an ASMA stain indicating muscle tissue may be stronger at the boundary of a lumen as compared to the center. For example, in the ASMA image, only in pixel locations where smooth muscle is present will there be high pixel intensity values. In other locations, including those where no smooth muscle is present, the pixels have a background value or low value.

As noted herein, ideally a smooth muscle outline surrounds the large and mature vessels, thus their signature (or stain signals indicative of their signature) can be used as a way to facilitate the identification the vessel structures enclosed by them. The appropriate image value threshold (or "image intensity value threshold") to detect the smooth muscle boundary is manually chosen from a set of training images by constructing a histogram of the ASMA pixel intensities of regions on the exterior outline of the large vessels, which are manually identified and annotated by a trained expert, such as a pathologist or other medical professional, and compared against the ASMA image pixel values from all other image regions. The ideal intensity contrast from the ASMA outline is set to the difference between the expected high pixel intensity value from the ASMA stained region to the background or low pixel intensity value. These chosen threshold and contrast values are used in all other image sets (for large vessel detection purposes).

Following identification of the lumens in the vessel channel images (S321), one or more spokes are distributed within each identified lumen (S322). Each spoke comprises a center location (x,y) and a number of lines extending radially outward from the center location (hereinafter "arms"). The arms are spaced equally from each other, i.e. the arms are distributed radially at a fixed angle relative to one another. For example, if 16 arms extend from a spoke, the arms of that spoke are evenly distributed at an angle of 22.5 degrees from each other.

Figure 4A:
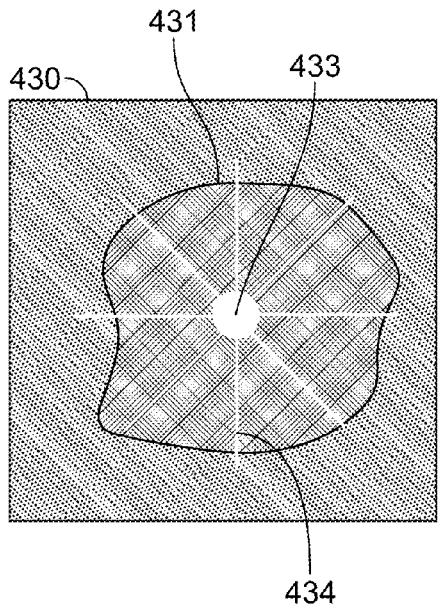
FIGS. 4A-4D illustrate a spoke feature detection method, according to an exemplary embodiment of the present subject disclosure.

By way of example, spoke generation is illustrated in FIG. 4A, which depicts an image derived from a tissue sample 430 and a lumen 431. A spoke 433 is placed in proximity to a center of the lumen 431 and a plurality of arms 434 extend radially outward from the spoke center 433.

The following spoke parameters are used by the spoke feature detection module 113 in the identification of large vessels:

(i) the coordinate position of the center location (x,y).

(ii) the number of arms extending from the center location. The tradeoff involved in choosing the number of the arms is the computation time and accuracy. With a larger number of arms, the accuracy of vessel detection is believed to be high, but the computation time increases linearly with the number of arms. In some embodiments, the number of arms selected ranges from about 16 to about 32. In other embodiments, a minimum of 16 arms is used.

(iii) the length of each arm. The length of the arm is set to a value that corresponds to the maximum radial distance of a mature vessel expected to be identified in the image. In some embodiments, a typical length is about 1 mm, which corresponds to about 200 pixels in the image with an individual pixel size of about 0.5 microns on each side.

(iv) two intensity contrast thresholds (T1) and (T2). T1 is the threshold on the difference between the median of the maximum intensity values from all the arms and the spoke center intensity value. T2 is the threshold on the difference between the spoke center value and the median of the minimum intensity values from all the arms.

To empirically determine T1 and T2, a set of manually annotated large vessels images were analyzed and the T1 contrast threshold was set to the average value of the absolute difference between the maximum intensity value along the vessel boundary and the vessel center in these images. In a similar manner, the T2 contrast threshold was set to the average value of the absolute difference between the spoke center value and the minimum intensity of the pixels enclosed within the vessels. Without wishing to be bound by any particular theory, the objective of using the two thresholds is to be sensitive enough to pick all the valid vessels, but at the same time specific enough such that any false vessel detections, due to high pixel intensity values from staining and autofluorescence artifacts, are rejected. The threshold T1 is intended to select the strong vessel contours, while the threshold T2 is intended to select regions within a lumen region, of low pixel intensity value, which is surrounded by high pixel intensity vessel contours (by suppressing any false detections in image regions which have high values but without any enclosed lumen).

In some embodiments, a spoke may be placed at an approximate center of the identified lumen, if known (S322), or a plurality of spokes may be placed substantially around or near an approximate center. Following placement of the spokes, an intensity of the pixels is retrieved along the length of each arm of each spoke to determine a boundary of the lumen (S323). In general, by observing contrasts between pixels at a center spoke location and pixels along each radially extending arm, a lumen boundary position may be determined, such as by comparing the contrasts observed and measured with contrast thresholds (T1 and T2) (S324). If the contrasts observed do not satisfy intensity contrast thresholds, the presumption is that the lumen is a false positive and the spoke is discarded (S325) (i.e. not retained for further processing and/or analysis). On the other hand, if the intensity contrasts observed satisfy contrast thresholds, the spoke is retained for further processing (S326).

More specifically, the observing of contrasts is achieved by comparing pixel intensity values along each spoke arm to pixel intensity values at a spoke center location. This process is repeated for all arms for each spoke. In some embodiments, minimum and maximum pixel intensity values along each arm are calculated (identified) and the location of the maximum pixel intensity along each arm is also identified. Next, a median of all minimum pixel intensity values is computed and compared to the average pixel intensity at the spoke center, averaged over a small radial neighborhood region, e.g. with a radius of 5 pixels. Similarly, a median of all maximum pixel intensity values is computed and compared to the pixel intensity at the spoke center. Spokes are retained for further processing (S326) only when two conditions are met, namely (a) the median of all maximum intensity values is at least T1 greater than the intensity value at the center; and (b) the median of all minimum intensity values is at most T2 less than the intensity value at the center. If one or both of these conditions are not met, the spoke is discarded (S325).

Figure 4B:
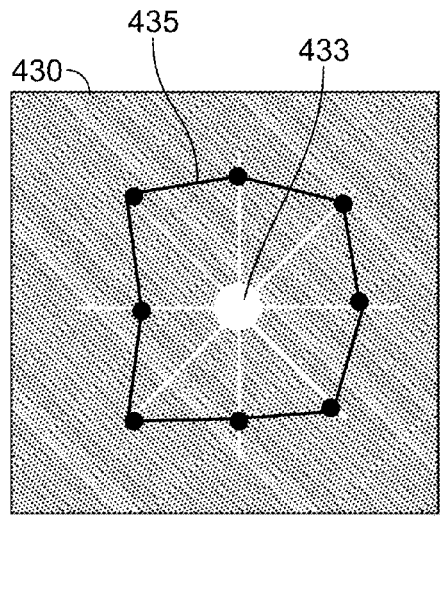
Figure 4C:
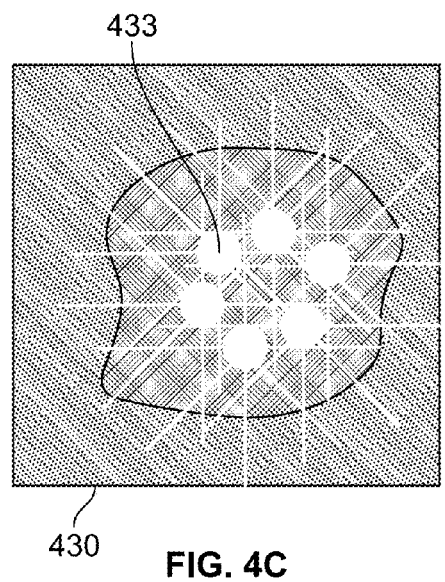
Figure 4D:
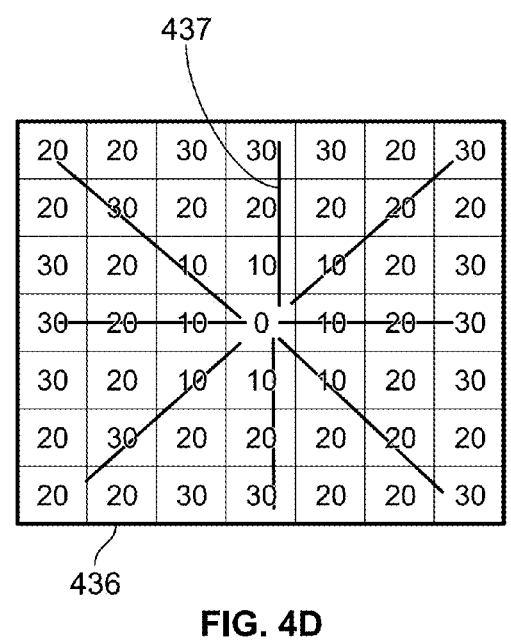

FIG. 4D illustrates the evaluation of pixel intensities of each arm. By way of example, FIG. 4D depicts a pixel array 436, having a grid size of 7 by 7 pixels, where a spoke is placed at a center pixel 0. Eight arms 437 extend from the center pixel 0, and each arm is three pixels in length. The numbers in the grid indicate intensity pixel values for each pixel along each arm, as well as a pixel intensity at the center area. In this particular example, the maximum pixel intensity values along each of the arms is 30. Accordingly, the median of maximum intensity values is 30. Likewise, the minimum pixel intensity values along each of the arms is 10 and thus a median of minimum intensity values is 10. T1 is set to a value of 50 and T2 is set to a value of 20 (or other predetermined values), on a scale of 0 to 255 values to yield valid vessel contours. These median values are then compared to the T1 and T2 contrasts thresholds to determine whether a spoke is acceptable or not.

Following acceptance of a spoke, a counter polygon is generated, whereby the contour polygon generated corresponds to the approximate boundaries of a large vessel. The locations of the maximum intensity values on each of the arms extending from the valid spoke center, identified in the earlier processing steps, constitute the vertices of the contour polygon. By way of example, and with reference to FIG. 4B, contour polygon 435 depicts the boundary of a detected lumen and is based on the pixel intensities measured at each spoke arm 434. In some embodiments, the points used to determine the shape of a polygon are derived from the points along each arm that have the highest pixel intensity values.

As described herein, a plurality of spokes may be dispersed within an approximate center of a lumen. Consequently, upon accepting or discarding a spoke, a determination is made as to whether there are any additional spokes to be observed (S328). If there are more spokes, then the next spoke is selected (S327), and the detection method disclosed herein is repeated. If there are no additional spokes, the contour polygons generated are output as one or more candidate vessels (S329).

In some embodiments, a plurality of spokes within a single lumen may be accepted as meeting the threshold contrast requirements noted above. In such a case, the center locations of each accepted spoke are averaged to determine a more precise center of the lumen. This is illustrated in FIG. 4C which depicts a series of spokes 433, where the depicted spokes may be used to determine a more precise center. By way of example only, the more precise center may be within an interior of a perimeter defined by the spokes 433, based on the averages of the coordinate (x,y) positions of the existing spokes 433.

In some embodiments, an additional spoke may be inserted into this more precise center, followed by the generation of a contour polygon based on data generated by the additional spoke at the more precise center. In some embodiments, the additional spoke inserted at the more precise center comprises more arms than the spokes placed at the approximate center. In this way, a more precise polygon may be generated based on data calculated from spokes having more arms. Other combinations of spoke measurements may become apparent to those having ordinary skill in the art in light of this disclosure. For instance, depending on the image quality and tissue appearance, the parameters for the spokes may be adjusted for optimal detection accuracy and speed.

Detection of Long and Narrow Vessels

In some embodiments, a line feature detection module 114 is used to detect long and narrow vessels within each of the plurality of vessel channel images. The long and narrow vessels identified are output to the vessel classification module 116. In general, the line feature detection module 114 detects local line parts, structures or features, and groups those line parts, structures or features together using agglomerative clustering. As detailed further herein, local line features may be detected in each of a plurality of regions in the vessel channel images, with lines in adjacent regions that meet specific threshold criteria being grouped together. All the lines within a group may then be used to collectively define a candidate vessel. A polygonal representation of the long vessels may be generated by connecting the centers of the grouped lines as vertices of the polygon. Each of these steps are described in greater detail herein.

Figure 5:
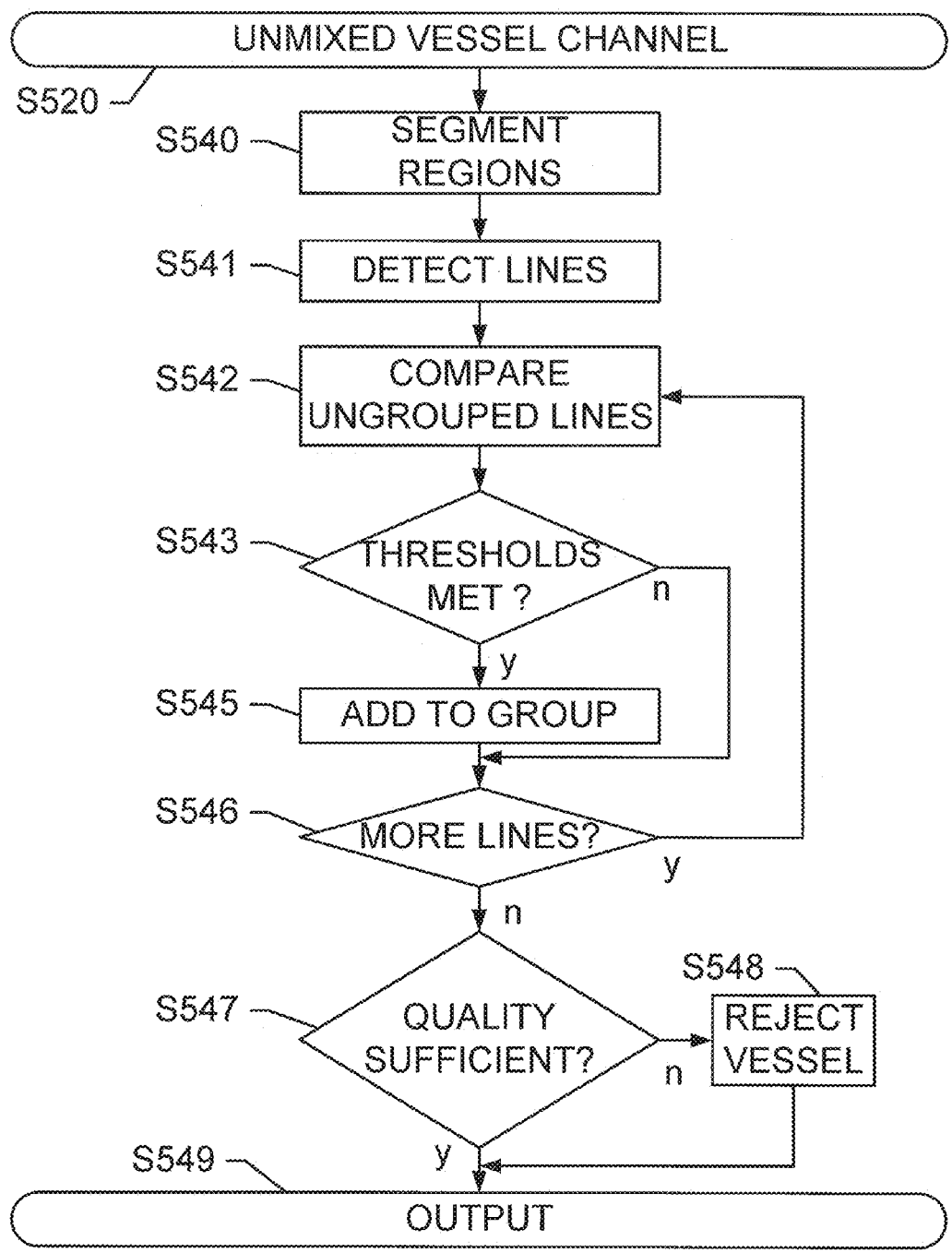
FIG. 5 illustrates a method for detecting long and narrow vessels, according to an exemplary embodiment of the present subject disclosure.

FIG. 5 provides a flowchart outlining the steps for detecting long and narrow vessels, according to some embodiments of the present subject disclosure. In some embodiments, local line features may be detected by first segmenting an image, or a region thereof, into a plurality of adjacent regions (S540), where the adjacent regions may overlap one another. For example, the image may be segmented into a plurality of adjacent and overlapping regions, each individual region having a size of N×N pixels. The amount of overlap may vary, but in some embodiments the amount of overlap is about half of the size of any region. For example, if the regions have dimensions of 16×16 pixels, the overlap may be about 8 pixels in each dimension. The process of segmentation (S540) is illustrated in FIG. 6A which shows the segmentation of an image 650, or a region of the image, into a plurality of adjacent regions 652. The regions may be placed over a detected line 651, and may overlap each other, as illustrated.

Following segmentation (S540), the strongest local line within each region is detected, i.e. the local line having the highest pixel intensities (S541). The strongest local line may be detected by random sampling consensus (RANSAC). RANSAC is an iterative method that is used to estimate parameters of a mathematical model from a set of data containing outliers. RANSAC is a resampling technique that generates candidate solutions by using the minimum number of observations (data points) required to estimate the underlying model parameters. In general, the basic RANSAC algorithm uses the following steps: (i) select randomly the minimum number of points required to determine the model parameters; (ii) solve for the parameters of the model; (iii) determine how many points from the set of all points fit with a predefined tolerance; (iv) if the fraction of the number of inliers over the total number points in the set exceeds a predefined threshold, re-estimate the model parameters using all the identified inliers and terminate; and (v) otherwise, repeat steps (i) through (iv) (maximum of N times). RANSAC is further described in "M. A. Fischler and R. C. Bolles. Random Sample Consensus: A paradigm for model fitting with applications to image analysis and automated cartography. Communications of the ACM, 24(6):381-395, 1981," the disclosure of which is hereby incorporated by reference in its entirety.

FIG. 6B illustrates the detection of the strongest local line 651 within each region 652. Within the region 652, the intensity values of the pixels are sorted and the set of pixels which fall above a certain percentile threshold are selected for line detection. In some embodiments, a percentile threshold of about 90% is used to select the set of strong intensity pixels.

Alternatively, an Otsu method may be used to automatically determine a threshold, and the pixel intensities above that threshold may be selected for line detection. Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

After thresholding, to determine the strongest line for those pixels meeting threshold values, the RANSAC algorithm, described above, is utilized, where several lines of different orientations are hypothesized based on all possible pairings of two randomly selected pixels, and for each line the line score is computed as the sum of all the intensity values of all the pixels falling on the hypothesized line. In some embodiments, the two randomly selected pixels are selected from the sub-set of pixels whose intensity value is above a threshold value chosen to select high intensity values from vessels. From the scores computed for all the hypothesized lines, the line with the highest line score is selected as the strongest line for the region 652. Subsequently, for the detected strong line 651 in region 652, a line segment 655 is approximated. First and second line segments 655 and 656 may be approximated based on their location in the adjacent regions 652. For example, the length of the first and second line segments 655 and 656 are bounded by the size of regions 652, and their endpoints may be approximated based on detected line 651.

Following the detection of the strongest lines in each region (S541), an agglomerative clustering method is used to group the lines (S542). Agglomerative clustering is a well known bottoms-up clustering method to group nearby data points into clusters which have a minimal difference on the defined similarity distance between any two data points, such as Euclidean squared distance metric. In the context of clustering vessels, a pair of lines or line groups that correspond to vessels are clustered together if the Euclidean distance between two lines—specified in terms of the line centers and line orientations—is small as compared to that is for all possible line pairings.

Agglomerative clustering may be performed using those methods known in the art or as provided below:

Let X={x1, x2, x3, . . . , xn} be the set of data points.

1) Begin with the disjoint clustering having level L(0)=0 and sequence number m=0.

2) Find the least distance pair of clusters in the current clustering, say pair (r), (s), according to d[(r),(s)]=min d[(i),(j)] where the minimum is over all pairs of clusters in the current clustering.

3) Increment the sequence number: m=m+1. Merge clusters (r) and (s) into a single cluster to form the next clustering m. Set the level of this clustering to L(m)=d[(r),(s)].

4) Update the distance matrix, D, by deleting the rows and columns corresponding to clusters (r) and (s) and adding a row and column corresponding to the newly formed cluster. The distance between the new cluster, denoted (r,$) and old cluster(k) is defined in this way: d[(k), (r,s)]=min (d[(k),(r)], d[(k),(s)]).

5) If all the data points are in one cluster then stop, else repeat from step 2).

Figure 6D:
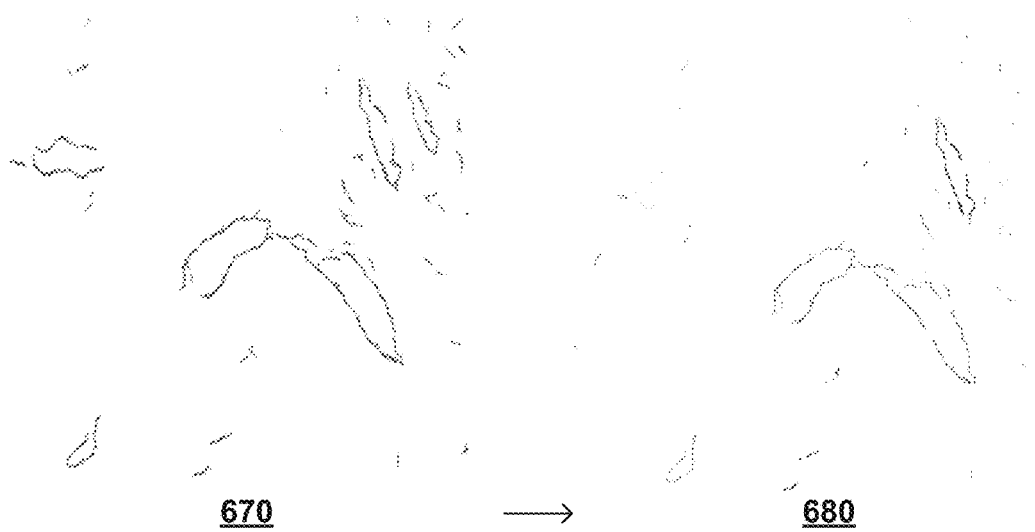
FIG. 6D illustrates the result of line segment grouping and further illustrates that line groups smaller than a pre-determined threshold may be ignored.

The step of comparing ungrouped lines is illustrated in FIG. 6C where the two line segments 655 and 656 are compared to determine an affinity between the two lines based on an orientation angle $\theta$ and a distance D. Indeed, each line is represented by the line center and orientation on which a measure of affinity between the two lines 655 and 656 is used. In some embodiments, the affinity between two lines may be represented by A=f($\theta$,D). If the affinity between any two lines matches or exceeds an affinity threshold (S543), or if the angle and distance satisfy a threshold, the two lines may be assigned into a group associated with a single vessel (S545). Line pairs that do not meet the affinity thresholds are simply ignored, and another line pair is selected by monitoring the next adjacent region. FIG. 6D illustrates line segment grouping (670) and further illustrates that line groups smaller than a pre-determined threshold may be ignored (680). Examples of affinity measures are the Euclidean distance between the centers of intersecting lines multiplied by the cosine of the intersection angle between them; or a Euclidean metrics on the (x,y, theta) parameters of each line; or other mathematical metrics that can be used to quantify the distance between two lines, where an Euclidean distance is the "ordinary" (i.e. straight-line) distance between two points in Euclidean space.

More specifically, the group affinity between lines is used to group the lines in a bottoms-up approach according to the agglomerative clustering method (described above), where each local line is assigned to a group based on an affinity between the lines. For example, two lines may be compared to determine an affinity between them, and the affinity may be based on an orientation of the lines relative to each other and distances between the lines. In this iterative bottoms-up merge process, the two lines or groups with lowest affinity are merged in each iteration. This procedure is executed by recursively by merging any unmerged line into the merged group, if the determined affinity for any two line groups does not exceed the affinity threshold (S543). Typically, the affinity threshold ranges from about 100 pixels to about 200 pixels (or a line length ranging from about 50 microns to about 100 microns). Any two lines that meet the affinity threshold may be assigned into the same group (S545), and connected or otherwise combined. These operations are recursively executed for all remaining lines in the region (S546) to determine whether or not they can be part of the group. When no additional lines satisfy the threshold comparison for the particular group, the process may be repeated for another ungrouped line to start the next new group. The process is repeated until there are no more ungrouped lines left.

When all available lines are grouped to collectively define a candidate vessel, the group is then subjected to a quality constraints analysis (S547). For instance, a quality of the candidate vessel may be determined by observing a contour of a polygon generated from the combined local lines, and summing values of candidate vessel pixels within a distance from contour points. The motivation being that for a good quality line, the average pixel intensity from all the pixels the polygon goes through would be high and similar to that of the pixel intensities on the line. For a bad quality line, such as due to the introduction of streaks or staining artifacts in the image or significant line breaks without any contiguous high intensities from a valid vessel outline, the intensities in pixels extending on either side of the lines will have very low values corresponding to the background. If the average intensity falls below a quality constraints threshold, the vessel contour may be rejected (S548).

An additional quality measure (S547) includes determining a 2-dimensional entropy of pixels within a region of the generated contour polygon and comparing the entropy with an entropy threshold. In some embodiments, the entropy is calculated by determining a histogram of intensity values. Image entropy is calculated by deriving the histogram of intensity values and calculating the probability of a sampled pixel having the value in each histogram bin. For instance, if there are 1000 pixels in a contour polygon, and 100 pixels within intensity bin 255, then there is a 1/10 chance of selecting a pixel that has the value of 255 at random. The base 2 logarithm of this probability is computed and weighted by the probability in order to compute the amount of information expected for any sampled pixel in units of bits. This consideration permits reporting of image entropy in terms of a defined unit, which here would be bits.

In some embodiments, image entropy may be calculated by using the following pseudo-code:

Function Entropy Calculator (argument=Histogram)
Sum=0
Entropy=0
For each Bin in Histogram: Sum=Sum+Bin Frequency
For each Bin in Histogram: Probability=Bin Frequency
If Probability>0.99/Sum:
Entropy=Entropy+(−1*Probability*(log(Probability)/log (2.0))
Return Entropy In some embodiments, a plurality of thresholds are defined whereby "0" indicates minimum entropy and highest quality and a maximum value, e.g. "100" indicates highest entropy and lowest quality. In other embodiments, an entropy threshold is about 11. As those of ordinary skill in the art will recognize, high entropy implies a high disorder or lack of structure in an image region. Where the entropy value is high, such as exceeding an entropy threshold limit, the contour polygon in question may be classified as an unstructured vessel (S549) rather than a long/narrow vessel. On the other hand, any polygons that do meet quality constraints may similarly be output (S549) as long and narrow vessels. It is believed that the operation of the line feature detection module 114 speeds up any subsequent vessel analysis, for example reducing a multi-million-pixel image to a plurality of line segments.

Embodiments of the invention may allow identifying cross sections of the large vessels and small vessels and longitudinal sections of the long and small vessels.

Figure 11:
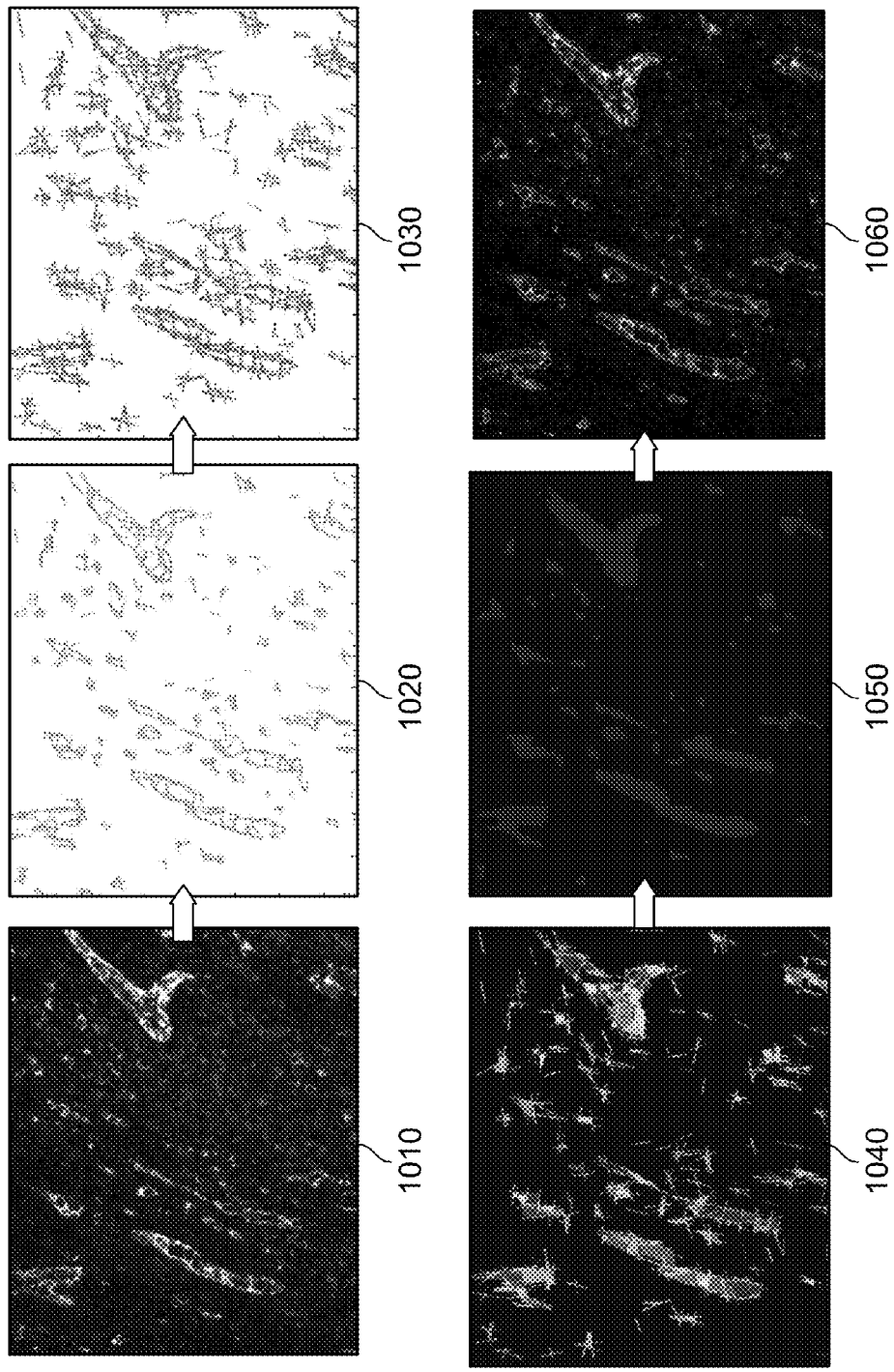
FIG. 11 provides a workflow for long and narrow vessel segmentation.

FIG. 11 provides a workflow for large vessel detection and illustrates an output of a large vessel detection scheme. For example, local edge lines are shown at 1020 and are derived from an input image 1010 after regions are segmented and lines are detected. Following the comparing of ungrouped lines, those meeting threshold requirements are linked, and the output is shown at 1030. Based on the linked lines, polygons are generated (as shown in image 1040). Image 1060 shows vessel boundaries after vessel segmentation (shown at 1050).

Detection of Small Vessels

In some embodiments, small vessels may be detected (S215) in each of the vessel channel images with a small vessel detection module 115. The small vessels identified are output to the vessel classification module 116. In general, the small vessel detection module 115 performs rolling-ball filtering (to remove smooth continuous backgrounds from images) and binary image operations, to detect small and compact vessels that would not otherwise be classified as large vessels or long and narrow vessels. Rolling ball background subtraction is described in S. R. Sternberg, "Biomedical Image Processing," Computer, vol. 16, no. 1, pp. 22-34, January 1983," the disclosure of which is hereby incorporated by reference herein in its entirety. Novel operations modify the traditional rolling-ball method by determining a mean value of pixels within a predetermined radius to achieve a smoothing result, and the smoothing result is thresholded to obtain a binary mask of the image, or a region thereof. The generated binary mask is grouped into regions using connected component labeling, and each component larger than a small vessel threshold size is output as a candidate small vessel.

Figure 7A:
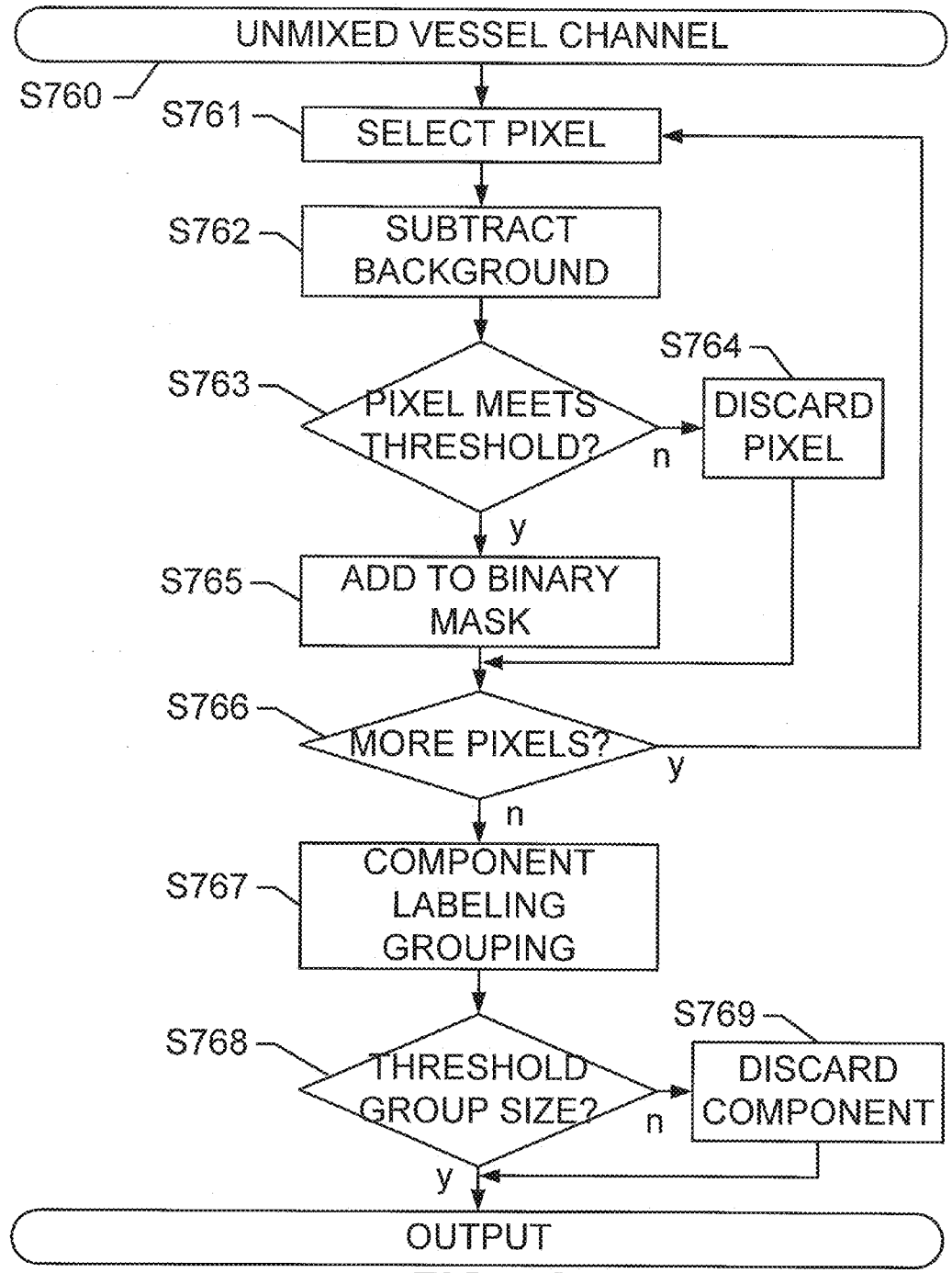
FIG. 7A illustrates a method for detecting small vessels, according to an exemplary embodiment of the subject disclosure.

More specifically, and with reference to FIG. 7A, small vessels are detected by first receiving an unmixed vessel channel as input (S760), and selecting a pixel among a plurality of pixels based on an intensity of the pixel. For example, all pixels having an intensity exceeding a particular threshold could be selected. Next, a background of a region around the selected pixel is subtracted (S762) by measuring a mean value of the surrounding pixels and smoothing at a background threshold value. In some embodiments, small neighborhood of 9×9 pixels is used to measure the mean value of surrounding pixels. If the resulting pixel meets a background threshold value (S763), the pixel is added to a binary mask (S765), and the next pixel is processed (S766). On the other hand, if the pixel does not meet the background threshold value, it is discarded (S764), and the next pixel, if any, is processed (S766). By way of example, the background threshold value is set to about 5% of the percentile value of the intensity values.

FIG. 7B further illustrates a workflow for small vessel determination. The first image, 770, represents an endothelial channel after rolling-ball filtering. Following thresholding, a binary mask is generated (771, 772). Image 773 provides an output where those vessels that are covered by detected large vessels are removed.

The generated mask may then be applied to the respective vessel channel image and connected components labeling may be used to connect pixels within the masked image (S767). In general, connected components labeling scans an image and groups its pixels into components based on pixel connectivity, i.e. all pixels in a connected component share similar pixel intensity values and are in some way connected with each other. Once all groups have been determined, each pixel is labeled with a gray level or a color (color labeling) according to the component it was assigned to. Connected component labeling works by scanning an image, pixel-by-pixel (from top to bottom and left to right) in order to identify connected pixel regions, i.e. regions of adjacent pixels which share the same set of intensity values V. In some embodiments, an eight-neighborhood connected components algorithm is used.

The resultant connected component is compared to a small vessel threshold size (S768), with every connected component larger than the small vessel threshold size being output as a candidate small vessel, and any components not meeting the small vessel threshold size are discarded (S769). In some embodiments, the small vessel threshold size is a radius ranging from about 10 microns to about 50 microns, translating to circumferential perimeter length of about 100 pixels to about 800 pixels. In other embodiments, the small vessel threshold size is about 1000 pixels. From the resulting component group, any features already detected by other vessel detection operations (e.g. large vessel detection or long and narrow vessel detection) are removed, and what remains are small vessels, contingent to satisfying threshold requirements. (see FIG. 7B).

Vessel Classification

In some embodiments, a vessel classification module 116 is used to classify the vessels detected in the each of the vessel channel images (obtained from steps S213, S214, and S215) as belonging to one of blood vessels or lymphatic vessels (or purely lymphatic vessels). Such classification of different vessels provides diagnostic value for pathologists, in addition to the shape and location characteristics of vessels, as described herein.

Figure 8:
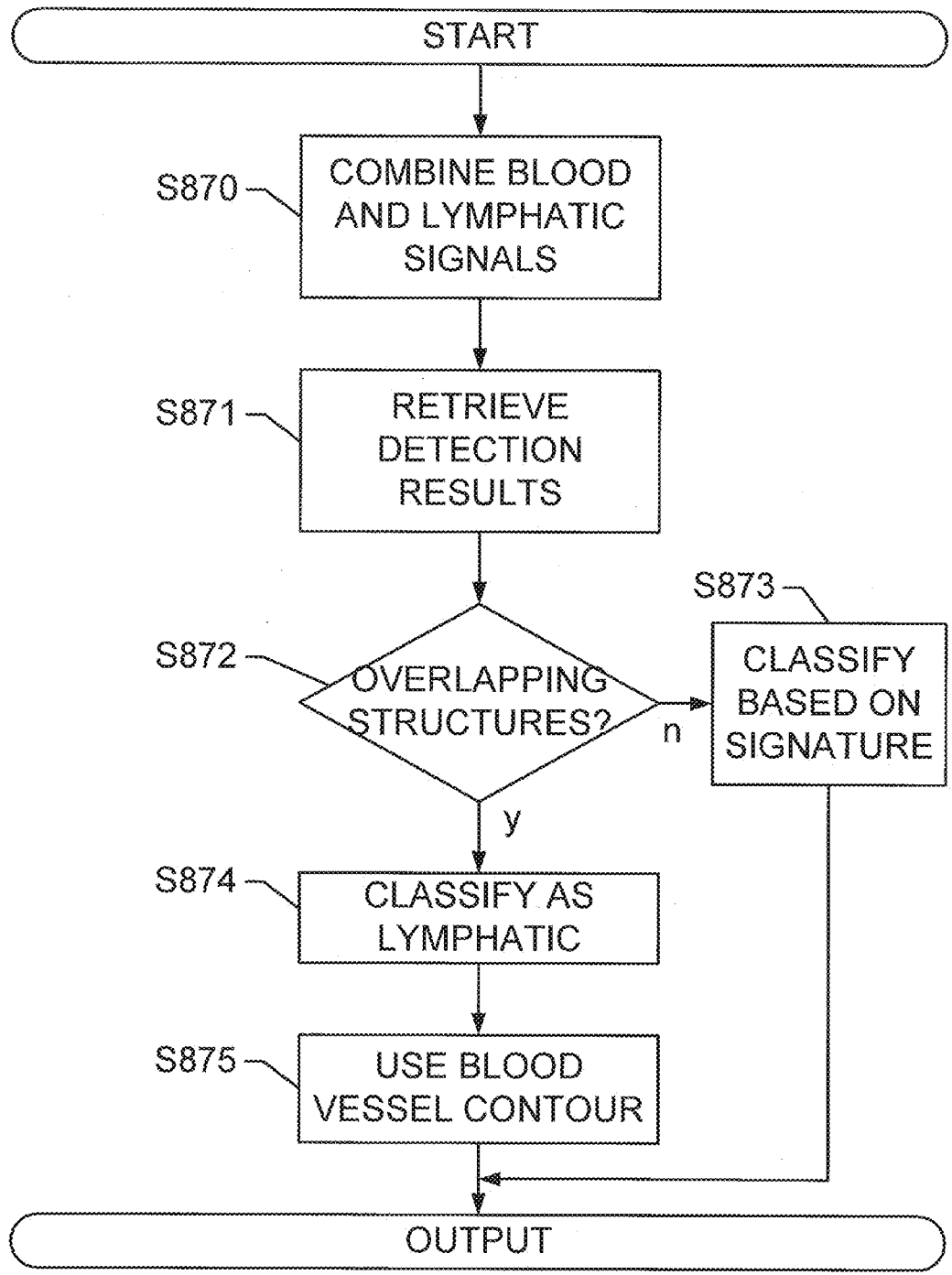
FIG. 8 illustrates a method for classifying vessels, according to exemplary embodiments of the subject disclosure.

With reference to FIG. 8, the method begins with combining the vessel channel images corresponding to the blood vessel channels and the lymphatic vessel channels (S870), and evaluating the different vessel structures (e.g. large vessels, long and narrow vessels, or small vessels) identified from steps S213, S214, and S215, described herein (S871). Those vessel structures that do not overlap (S872) between the different image channels are classified based on their spectral signatures (S873), i.e. by identifying stains corresponding to either blood vessels, lymphatic vessels, or purely lymphatic vessels.

Purely lymphatic vessels are the ones that appear only in the lymphatic vessel channel images. In contrast, lymphatic vessels have a signature in both the lymphatic and blood vessel channel images. Blood vessels only appear in the blood vessel channel images. The skilled artisan will recognize that a lymphatic vessel may be stained by both (i) a CD31 and CD34 stain combination, which is typically used to stain blood vessels, and (ii) a podoplanin stain combination, which is typically used to stain purely lymphatic vessels. (Podoplanin is a transmembrane mucoprotein (38 kd) recognized by the D2-40 monoclonal antibody. Podoplanin is selectively expressed in lymphatic endothelium as well as lymphangiomas, Kaposi sarcomas and in a subset of angiosarcomas with probable lymphatic differentiation.)

While lymphatic vessels may cross-stain as noted above, blood vessels, on the other hand, typically do not stain in the presence of the QD565 marker. Therefore, vessels identified as overlapping in both channels (S872) may trigger a determination that the vessel is a lymphatic vessel (S874), given the predisposition to cross-staining. Therefore, any outputs that overlap by at least an overlap threshold factor may be considered as lymphatic vessels that are stained with "blood vessel" stains. In some embodiments, a vessel may be classified as a lymphatic vessel if there is a greater than 0.33 similarity between two vessels in both the blood and lymphatic vessel channel.

The skilled artisan will also recognize that blood vessel markers have stronger signals than lymphatic marker. Therefore, in some embodiments, the contour or shape of the vessel from the blood vessel channel may be used to define a lymphatic vessel (S875). Moreover, a purely lymphatic vessel is one that does not have any blood vessel stains, and is therefore classified as such (S873).

The particular sequence of detecting large/narrow and long/small vessels first and later performing a clustering to identify blood vessels and lymphatic vessels may be advantageous as is has been observed that said specific sequence is more accurate than e.g. classification approaches trying to distinguish said three different vessel types and the two different tissue types (blood/lymphatic tissue) at the same time.

Detection of Vessel Maturity

In some embodiments, a maturity determination module 117 may be used to determine whether a particular vessel (identified in steps S213, S214, and S215) is mature or immature, enabling precise and detailed diagnoses of advancing or new tumors. The skilled artisan will appreciate that immature vessels are indicative of an aggressively growing tumor, and thus identification of those immature vessels may help to elucidate tumor diagnosis (and/or treatment with an appropriate anti-angiogenesis agent).

Figure 9:
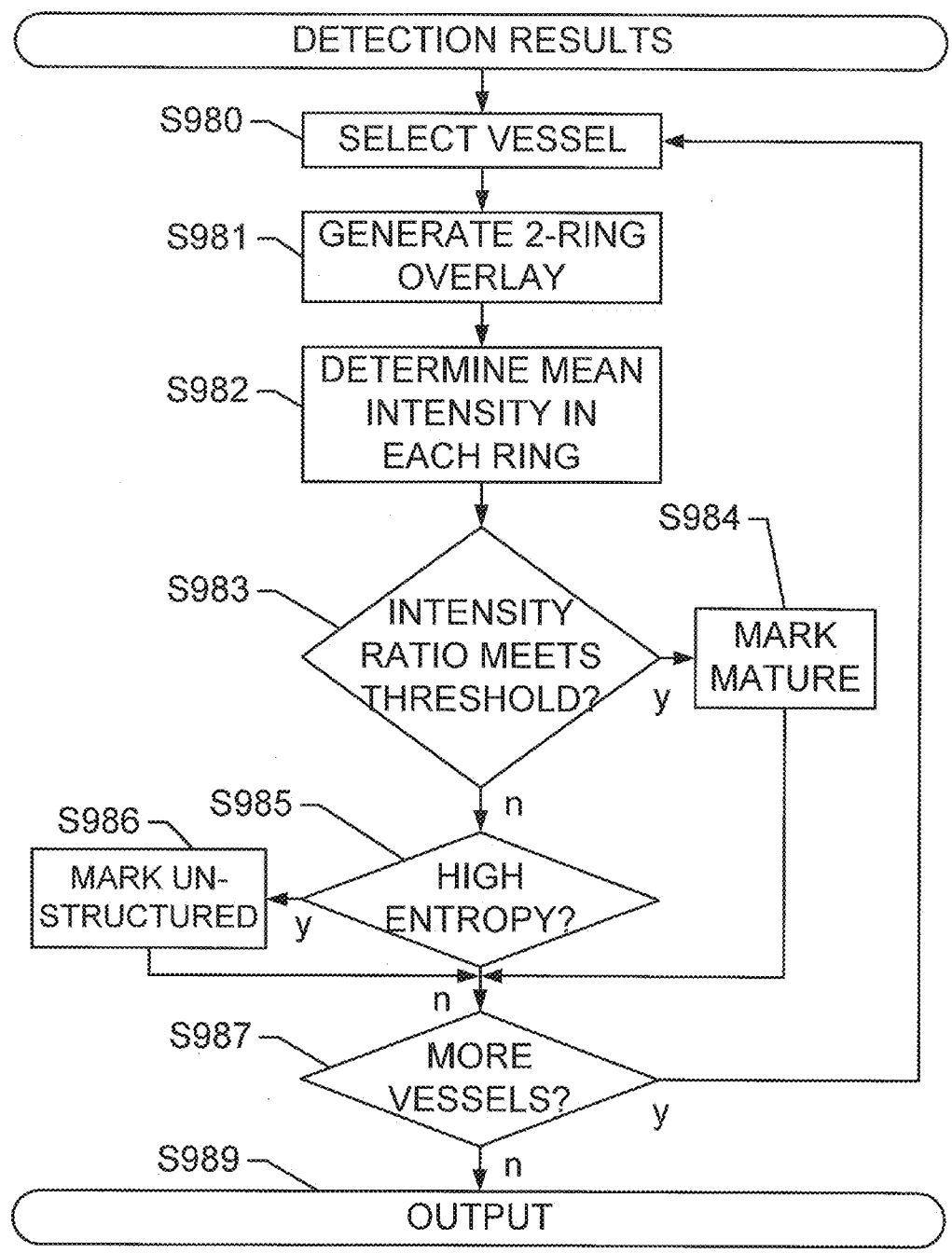
FIG. 9 illustrates a method for determining a maturity of a vessel, according to exemplary embodiments of the subject disclosure.

With reference to FIG. 9, an identified vessel is first selected (S980). In some embodiments, a ring-shaped detector is generated (S981) to detect muscle tissue surrounding the vessels. In some embodiments, the muscle is stained using an anti-smooth muscle antibody (ASMA) and intensities from the pixels in the muscle tissue stained with ASMA are computed.

In some embodiments, the generated ring-shaped detector operates by overlaying two concentric rings, an inner ring and an outer ring, over an identified vessel, and calculates a mean pixel intensity of ASMA stain in both rings (S982). The typical ring size is determined by the average radius of the mature vessels and an annular region is set to about 10% of the radius size of the mature vessel size (the rationale being that only the mature vessels have ASMA around them).

A difference of the mean pixel intensities between the rings is compared (S983) with a vessel maturity threshold to determine whether or not a ring of ASMA exists. Since ASMA stains bind to muscle tissue, and a notable presence of muscle tissue around a vessel indicates that the vessel is mature, a presence of an ASMA ring may trigger a determination that the vessel is a mature vessel (S984). In some embodiments, the vessel maturity threshold ranges from about 0 to about 1, with a value of 0 being indicative of immature vessels with no fractional area of the ring expressing ASMA signal, and with a value of 1 being indicative of completely mature vessels with a complete circumferential ring expressing the ASMA signal. In other embodiments, the maturity threshold about 0.25.

Figure 10:
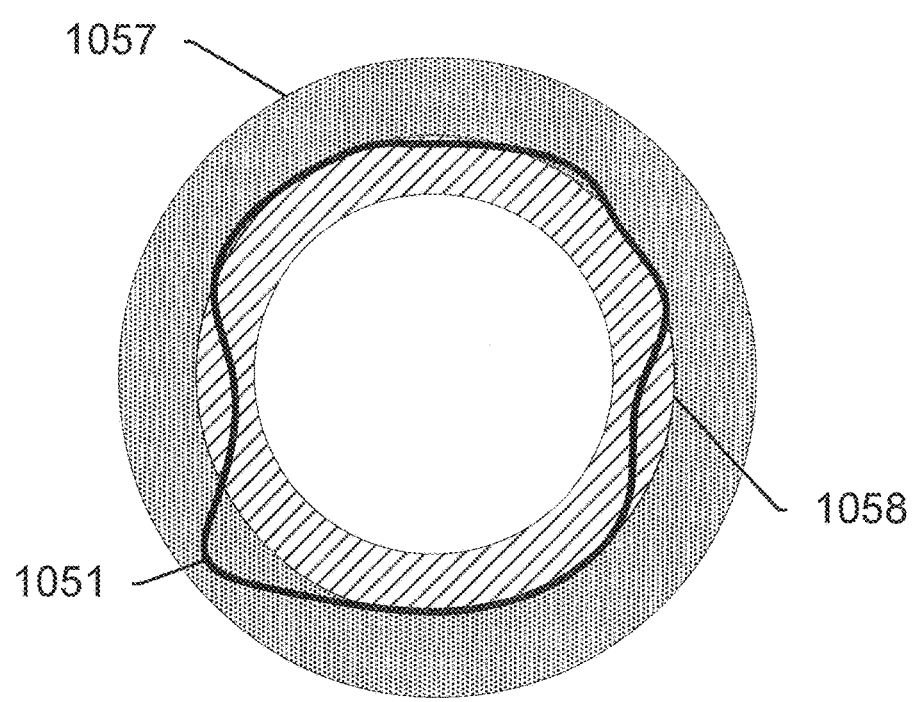
FIG. 10 illustrates a maturity determination method, according to exemplary embodiments of the subject disclosure.

FIG. 10 illustrates the process of determining vessel maturity. As described herein, a ring-shaped detector comprising an outer ring 1057 and an inner ring 1058 is overlaid on a detected vessel 1051. A mean pixel intensity of ASMA in both rings 1057 and 1058 is calculated, and a difference of the mean pixel intensities between the rings is compared with a vessel maturity threshold to determine whether or not a ring of ASMA exists.

Those vessels that are not classified as mature by ASMA ring detection are further evaluated by computing an entropy value of those pixels within a region of a generated contour polygon of the vessel (the contour polygons generated as described herein) and comparing the computed entropy with a vessel entropy threshold (S985). As noted herein, a high entropy value is significant because it implies a high disorder or a lack of structure in the region. A vessel having a high entropy value, such as an entropy value exceeding the entropy threshold, may be classified as an unstructured vessel (S986), not as a blood vessel, and may be output accordingly. The maturity analysis is applied to all remaining vessels (S987) and the process repeats from vessel selection (S980). If there are no additional vessels for analysis, then the maturity of the observed vessels is output (S989).

Detection of Cells and Nuclei

In some embodiments, cells and nuclei are optionally detected (S218) in each of the vessel channel images with a nuclear detection module 118, allowing for co-localization of identified vessels and cells. In some embodiments, the tissue samples have been treated with stains that identify one or more types of cells or nuclei, e.g. Ki-67, CD3, and image channels derived from the multiplex image for those stains may be used in the identification of cells and nuclei.

In some embodiments, the nuclear detection module 118 identifies nuclei using radial symmetry to detect centers of nuclei and then classifies the nuclei based on the intensity of stains around the cell centers. For example, given an unmixed image channel, an image magnitude is computed from the channel, and one or more votes at each pixel are accumulated by adding the summation of the magnitude within a selected region. Mean shift clustering may be used to find the local centers in the region, with the local centers representing actual nuclear locations. Radial symmetry is a technique known to those of ordinary skill in art (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein).

Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range $[\pi/4, \pi/8]$). In the resulting voting space, local maxima locations that have a vote value higher than a predefined threshold value are saved out as seed points. Extraneous seeds may be discarded later during subsequent segmentation or classification processes.

Nuclei may be identified using other techniques known to those of ordinary skill in the art. For example, an image magnitude may be computed from a vessel channel, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model based segmentation may be utilized to detect nuclei (i.e. learning the shape model of the nuclei from a training data set and using that as the prior knowledge to segment the nuclei in the testing image).

Although nuclear detection is optional, it is useful to analyze and quantify tumor vascularization. For example, within each blood vessel, there may be tumorous epithelial cells which may be expressing certain tumor biomarkers, such as Ki67, apoptic or hypoxic cells. Thus, the blood vessel may be further subtyped as containing the particular biomarker type epithelial cells. In addition, it is also of interest to evaluate the nearest distance of the micro-vessels to the tumor cells or the tumor cells of a particular subtype, such as Ki67 which is indicative of a proliferative tumor cell.

Examples

Figure 13:
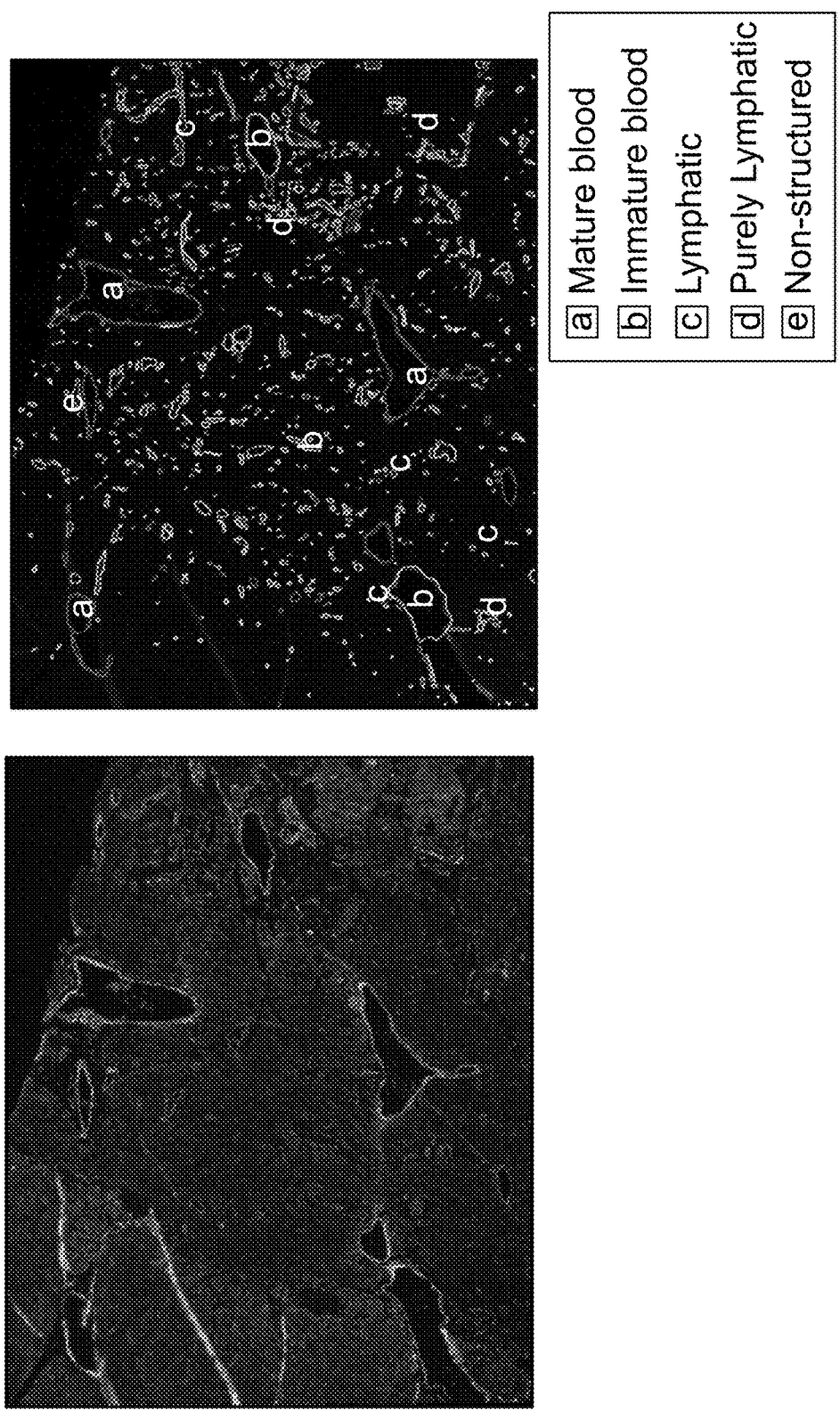
FIG. 13 provides a result (output) of a vessel detection and classification workflow.

By way of example, FIGS. 12 and 13 illustrate the results (output) of the vessel detection workflows described herein. In the images of FIG. 13, "a" represents a mature blood vessel; "b" represents an immature blood vessel; "c" represents a lymphatic vessel; "d" represents a purely lymphatic vessel; and "e" describes a non-structured element.

Other Components for Practicing Embodiments of the Present Disclosure

The computer system of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The specimen processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners (hereinafter collectively referred to as "stains"). The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus may be a brightfield imager slide scanner, a microscope associated with or including a scanner or spectral camera, or any source that can capture image content at a range of frequencies, enabling hyperspectral or fluorescence imaging. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities. In other embodiments, the imaging apparatus includes a digital camera coupled to a microscope.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s).

As described above, the modules include logic that is executed by processor 105. "Logic," as used herein and throughout this disclosure, refers to any information having the form of instruction signals and/or data that may be applied to affect the operation of a processor. Software is one example of such logic. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 109 of FIG. 1A can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims. The foregoing written specification is considered to be sufficient to enable one skilled in the art to practice the disclosure.

STATEMENT OF INDUSTRIAL APPLICABILITY

The present disclosure has industrial applicability in the field of diagnostics.

Additional Embodiments

1. A computer device for vessel identification and classification comprising one or more processors and at least one memory, the at least one memory storing non-transitory computer-readable instructions for execution by the one or more processors to cause the one or more processors to: detect one or more vessels in each of a plurality of vessel channel images, wherein each of the one or more detected vessels are selected from the group consisting of large vessels, long and narrow vessels, and small vessels; classify the detected one or more vessels as blood vessels or lymphatic vessels; and identify a maturity of each of the one or more detected vessels.

2. The computer device of embodiment 1, wherein the detection of large vessels comprises identifying lumens having low pixel intensity value inner regions surrounded by high pixel intensity value contours.

3. The computer device of embodiment 2, wherein the identifying of lumens having low pixel intensity value inner regions surrounded by high pixel intensity value contours comprises evaluating contrasts between dark regions in the vessel channel images and comparatively lighter regions in the vessel channel images.

4. The computer device of embodiment 2, wherein the detection of large vessels comprises determining a boundary of the identified lumen, wherein the boundary of the identified lumen is determined (a) by placing a spoke at an approximate center of the identified lumen, each spoke having a plurality of arms extending radially from a center of the spoke, (b) evaluating pixel intensities along each arm and pixel intensities at the spoke center, (c) retaining the spoke meeting contrast threshold values; and (d) generating a contour polygon based on the retained spoke.

5. The computer device of any one of the previous embodiments, wherein the detection of long and narrow vessels comprises (i) detecting local lines in a plurality of overlapping image regions in a vessel channel image; and (ii) grouping together the detected local lines from the overlapping image regions that meet an affinity threshold.

6. The computer device of embodiment 5, wherein the grouping together of the detected local lines from the overlapping regions that meet the affinity threshold comprises (i) calculating an affinity between two adjacent local lines in the overlapping region by evaluating a distance and an angle between the two adjacent local lines, and (ii) comparing the calculated affinity to an affinity threshold.

7. The computer device of embodiment 6, wherein a contour polygon is generated from the grouped local lines.

8. The computer device of any one of the previous embodiments, wherein the detection of small vessels comprises (i) generating a binary mask comprising pixels whose intensities are greater than surrounding background pixel intensities; (ii) connecting pixels within the generated binary mask; and (iii) evaluating whether a size of the connected pixels meets a small vessel threshold size.

9. The computer device of embodiment 8, wherein the generation of the binary mask comprises (i) selecting pixels among a plurality of pixels; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing he subtracted values to a background intensity threshold; and (v) adding those pixels whose subtracted value intensities exceed the background intensity to the binary mask.

10. The computer device of embodiment 8, wherein the pixels within the generated binary mask are connected using a connected components labeling process.

11. The computer device of any one of the previous embodiments, wherein the classifying of the detected one or more vessels comprises identifying overlapping vessels in each of the plurality of vessel channel images.

12. The computer device of embodiment 11, wherein those detected vessels that do not overlap are classified based on stain signals.

13. The computer device of any one of the previous embodiments, wherein instructions are provided for estimating a maturity of a detected vessel.

14. The computer device of embodiment 13, wherein the estimating of the maturity of a detected vessel comprises evaluating a difference in mean pixel intensities between inner and outer rings placed around the detected vessel.

15. The computer device of embodiment 14, wherein the inner and outer rings comprise pixels whose intensities correspond to signals of tissue stained with an anti-smooth muscle antibody.

16. The computer device of any one of the previous embodiments, wherein instructions are provided for detecting nuclei.

17. A computer implemented method for detecting and analyzing vessels comprising detecting one or more vessels in each of a plurality of vessel channel images, wherein each of the one or more detected vessels are selected from the group consisting of large vessels, long and narrow vessels, and small vessels; classifying the detected one or more vessels as blood vessels or lymphatic vessels; and identifying a maturity of each of the one or more identified vessels.

18. The computer implemented method of embodiment 17, wherein the detecting of large vessels comprises identifying lumens having low pixel intensity value inner regions surrounded by high pixel intensity value contours.

19. The computer implemented method of embodiment 18, wherein the identifying of lumens having low pixel intensity value inner regions surrounded by high pixel intensity value contours comprises evaluating contrasts between dark regions in the vessel channel images and comparatively lighter regions in the vessel channel images.

20. The computer implemented method of embodiment 19, wherein the detection of large vessels comprises detecting a boundary of the identified lumen.

21. The computer implemented method of embodiment 20, wherein the boundary of the identified lumen is determined (a) by placing a spoke at an approximate center of the identified lumen, each spoke having a plurality of arms extending radially from a center of the spoke, (b) evaluating pixel intensities along each arm and pixel intensities at the spoke center, (c) retaining the spoke meeting contrast threshold values; and (d) generating a contour polygon based on the retained spoke.

22. The computer implemented method of any one of embodiments 17-21, wherein the detection of long and narrow vessels comprises (i) detecting local lines in a plurality of overlapping regions in a vessel channel image; and (ii) grouping together the detected local lines from the overlapping regions that meet an affinity threshold.

23. The computer implemented method of embodiment 22, wherein the grouping together of the detected local lines from the overlapping regions that meet the affinity threshold comprises (i) calculating an affinity between two adjacent local lines in the overlapping region by evaluating a distance and an angle between the two adjacent local lines, and (ii) comparing the calculated affinity to an affinity threshold.

24. The computer implemented method of embodiment 42, wherein a contour polygon is generated from the grouped lines.

25. The computer implemented method of any one of embodiments 17-24, wherein the detection of small vessels comprises (i) generating a binary mask comprising pixels whose intensities are greater than surrounding background intensities; (ii) connecting pixels within the generated binary mask; and (iii) evaluating whether a size of the connected pixels meets a small vessel threshold size.

26. The computer implemented method of embodiment 25, wherein the generation of the binary mask comprises (i) selecting pixels among a plurality of pixels; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing the subtracted values to a background intensity threshold; and (v) adding those pixels whose subtracted value intensities exceed the background intensity to the binary mask.

27. The computer implemented method of embodiment 26, wherein the pixels within the generated binary mask are connected using a connected components labeling process.

28. The computer implemented method of any one of embodiments 17-27, wherein the classifying of the detected one or more vessels comprises identifying overlapping vessels in each of the plurality of vessel channel images.

29. The computer implemented method of embodiment 28, wherein those detected vessels that do not overlap are classified based on stain signals.

30. The computer implemented method of any one of embodiments 17-29, wherein the method further comprises the step of estimating a maturity of a detected vessel.

31. The computer implemented method of embodiment 30, wherein the estimating of the maturity of a detected vessel comprises evaluating a difference in mean pixel intensities between inner and outer rings placed around the detected vessel.

32. The computer implemented method of embodiment 31, wherein the inner and outer rings comprise pixels whose intensities correspond to signals of tissue stained with an anti-smooth muscle antibody.

33. The computer implemented method of any one of embodiments 17-32, wherein the method further comprises the step of detecting nuclei.

34. A computer device for vessel identification and classification comprising one or more processors and at least one memory, the at least one memory storing non-transitory computer-readable instructions for execution by the one or more processors to cause the one or more processors to (i) execute instructions in at least one of a spoke feature detection module, a line feature detection module, or a small vessel detection module to detect one or more vessels from each of a plurality of vessel channel images; (ii) execute instructions in a vessel classification module to classify the detected one or more vessels as blood vessels or lymphatic vessels; and (iii) execute instructions in a maturity determination module to determine a maturity of the one or more detected vessels.

35. The computer device of embodiment 34, wherein the computer device further executes instructions in a nuclear detection module to identify nuclei.

36. A specimen analyzer comprising the computer system as in any of embodiments 1 to 16 or 34 to 35, and an image acquisition system.

37. A computer device for vessel identification and classification consisting essentially of one or more processors and at least one memory, the at least one memory storing non-transitory computer-readable instructions for execution by the one or more processors to cause the one or more processors to: detect one or more vessels in each of a plurality of vessel channel images, wherein each of the one or more detected vessels are selected from the group consisting of large vessels, long and narrow vessels, and small vessels; classify the detected one or more vessels as blood vessels or lymphatic vessels; and identify a maturity of each of the one or more detected vessels.

38. A computer device for vessel identification and classification consisting of one or more processors and at least one memory, the at least one memory storing non-transitory computer-readable instructions for execution by the one or more processors to cause the one or more processors to: detect one or more vessels in each of a plurality of vessel channel images, wherein each of the one or more detected vessels are selected from the group consisting of large vessels, long and narrow vessels, and small vessels; classify the detected one or more vessels as blood vessels or lymphatic vessels; and identify a maturity of each of the one or more detected vessels.

39. A computer implemented method for vessel identification comprising: analyzing each of a plurality of digital images of a tissue sample for identifying vessels of at least one of three different types, the first type, referred to as large vessels, comprising vessels forming the secondary arterial tree structures and capillary vessels; the second type, referred to as long and narrow vessels, comprising blood capillaries or newly formed vessels, the third type, referred to as small vessels, comprising mature arteries and veins; analyzing the identified vessels for classifying the identified vessels as blood vessels or lymphatic vessels; and identify a maturity of each of the one or more detected vessels.

40. The computer-implemented method of embodiment 39, wherein the detection of vessels of the first type comprises: evaluating intensity contrasts of one or more of the plurality of digital images for identifying lumen pixel regions (431) and boundary pixel regions fulfilling the condition that the lumen pixel region is a pixel region whose pixel intensities are below the pixel intensities of the boundary regions, the lumen and the boundary pixel regions lying in the same or in different ones of the plurality of digital images, the lumen pixel region being surrounded by the boundary pixel region, and returning an identified lumen pixel region surrounded by a boundary pixel region as an identified large vessel.

41. The computer-implemented method of embodiment 40, wherein the detection of the boundary of the identified lumen is determined by: (a) by placing a spoke (433) at an approximate center of the identified lumen, each spoke having a plurality of arms (434, 437) extending radially from a center of the spoke, (b) evaluating pixel intensities along each arm and pixel intensities at the spoke center, (c) retaining the spoke selectively where it meets contrast threshold values; and (d) generating a contour polygon (435) from the retained spoke.

42. The computer-implemented method of embodiment 41, wherein retaining the spoke meeting contrast threshold values comprises, for at least one of the digital images: identify the intensity value of the spoke center; identify the median of the maximum intensity values from all the arms and the spoke center intensity value; identify the median of the minimum intensity values from all the arms and the spoke center intensity value; determining i) if the median of all maximum intensity values is at least a first threshold (T1) greater than the intensity value at the spoke center; determining ii) if the median of all minimum intensity values is at most a second threshold (T2) less than the intensity value at the spoke center; and selectively in case the determination i) and ii) returns true, retaining and using the spoke for generating the contour polygon.

43. The computer-implemented method of embodiment 41 or 42, wherein using the spoke for generating the contour polygon comprises: in each of the arms of the spoke, identifying the pixel having the highest intensity value; and connecting the identified pixels to form the polygon.

44. The computer-implemented method of embodiment 39, wherein the detection of vessels of the second type comprises: (i) detecting line sections (656, 655) in a plurality of overlapping regions (652) in at least one of the digital images; and (ii) grouping together the detected line sections from the overlapping image regions that meet an affinity threshold in respect to each other, the grouping being performed in an agglomerative clustering procedure; and (iii) returning the grouped lines as a detected vessel of the second type.

45. The computer-implemented method of embodiment 44, wherein the grouping comprises: (i) calculating an affinity between two adjacent line sections in the overlapping region by evaluating a distance and an angle between the two adjacent line sections, and (ii) comparing the calculated affinity to an affinity threshold for selectively grouping the ones of the line sections into one group whose affinity to each other exceeds the affinity threshold.

46. The computer-implemented method of embodiment 44 or 45, further comprising generating a contour polygon from the grouped line segments.

47. The computer-implemented method of any one of embodiments 44-46, further comprising: identifying the entropy of pixels contained in the identified vessel of the second type; comparing the determined entropy with an entropy threshold and discarding the identified vessel of the second vessel type in case the determined entropy is higher than the entropy threshold; or identifying the average intensity of pixels contained in an image area lying farther away from the identified vessel than a distance threshold; comparing the determined average intensity with an intensity threshold and discarding the identified vessel of the second vessel type in case the determined average intensity is higher than the intensity threshold.

48. The computer-implemented method of embodiment 39, wherein the detection of vessels of the third type comprises (i) generating a binary mask comprising pixels whose intensities are greater than surrounding background pixel intensities; (ii) connecting pixels within the generated binary mask; and (iii) evaluating whether a size of the connected pixels meets a small vessel threshold size.

49. The computer-implemented method of embodiment 48, wherein the generation of the binary mask comprises, for at least one of the digital images: (i) selecting pixels among a plurality of pixels in the at least one digital image; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing the subtracted values to a background intensity threshold; and (v) adding those pixels whose subtracted value intensities exceed the background intensity threshold to the binary mask.

50. The computer-implemented method of embodiment 49, wherein the pixels within the generated binary mask are connected using a connected components labeling process.

51. The computer-implemented method of any one of embodiments 39-50, wherein the classifying of the detected one or more vessels comprises: identifying overlapping vessels in each of the plurality of vessel channel images; analyzing pixel intensity values of detected vessels that do not overlap for classifying the vessel as blood vessel or lymphatic vessel, the pixel intensities correlating with the staining intensity of a stain that selectively stains a biomarker being specific for either blood vessels or lymphatic vessels.

52. The computer-implemented method of any one of embodiments 39-51, wherein the identification of the maturity of each of the one or more detected vessels comprises: overlaying each identified vessel (1051) with a concentric ring structure comprising an inner (1058) and an outer (1057) ring, the inner ring being adjacent to the outer ring, the inner ring being an inner ring of a circle having the expected radius of a mature vessel, the outer ring being an outer ring of said circle; mapping the concentric ring structure to one of the digital images, the pixel intensities of said one digital image correlating with the staining intensity of a stain that selectively stains a biomarker being specific for smooth-muscle tissue; identifying the mean intensity values of pixels in the mapped inner ring in the one digital image; identifying the mean intensity values of pixels in the mapped outer ring in the one digital image; determining a difference in mean pixel intensity values between the inner and outer rings; and where the determined difference exceeds a vessel maturity threshold, returning that said vessel is mature.

53. An image analysis system for vessel identification and classification comprising one or more processors (105) and at least one memory, the at least one memory storing non-transitory computer-readable instructions for execution by the one or more processors to cause the one or more processors to perform a method according to any one of embodiments 39-52.

What is claimed is:

1. A non-transitory computer-readable medium for storing computer-executable instructions that are executed by a processor to perform operations comprising: detecting one or more vessels in each of a plurality of vessel channel images, wherein each of the one or more detected vessels are selected from a group consisting of large vessels, long and narrow vessels, and small vessels; wherein the detection of large vessels comprises identifying lumens having low pixel intensity value inner regions surrounded by high pixel intensity value contours; and wherein the detection of long and narrow vessels comprises (i) detecting local lines in a plurality of overlapping image regions in a vessel channel image; and (ii) grouping together the detected local lines from the overlapping image regions that meet an affinity threshold; classifying the detected one or more vessels as blood vessels or lymphatic vessels; and identifying a maturity of each of the one or more detected vessels, wherein the plurality of vessel channel images are derived from a tissue sample having one or more stains.

2. The non-transitory computer-readable medium of claim 1, wherein the identifying of lumens having low pixel intensity value inner regions surrounded by high pixel intensity value contours comprises evaluating contrasts between dark regions in the vessel channel images and comparatively lighter regions in the vessel channel images.

3. The non-transitory computer-readable medium of claim 1, wherein the detection of the large vessels comprises determining a boundary of the identified lumen, wherein the boundary of the identified lumen is determined (a) by placing a spoke at an approximate center of the identified lumen, each spoke having a plurality of arms extending radially from a center of the spoke, (b) evaluating pixel intensities along each arm and pixel intensities at the spoke center, (c) retaining the spoke meeting contrast threshold values; and (d) generating a contour polygon based on the retained spoke.

4. The non-transitory computer-readable medium of claim 1, wherein the grouping together of the detected local lines from the overlapping regions that meet the affinity threshold comprises (i) calculating an affinity between two adjacent local lines in the overlapping region by evaluating a distance and an angle between the two adjacent local lines, and (ii) comparing the calculated affinity to an affinity threshold.

5. The non-transitory computer-readable medium of claim 4, wherein a contour polygon is generated from the grouped local lines.

6. The non-transitory computer-readable medium of claim 1, wherein the detection of small vessels comprises (i) generating a binary mask comprising pixels whose intensities are greater than surrounding background pixel intensities; (ii) connecting pixels within the generated binary mask; and (iii) evaluating whether a size of the connected pixels meets a small vessel threshold size.

7. The non-transitory computer-readable medium of claim 6, wherein the generation of the binary mask comprises (i) selecting pixels among a plurality of pixels; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing he subtracted values to a background intensity threshold; and (v) adding those pixels whose subtracted value intensities exceed the background intensity to the binary mask.

8. The non-transitory computer-readable medium of claim 6, wherein the pixels within the generated binary mask are connected using a connected components labeling process.

9. The non-transitory computer-readable medium of claim 1, wherein the classifying of the detected one or more vessels comprises identifying overlapping vessels in each of the plurality of vessel channel images.

10. The non-transitory computer-readable medium of claim 9, wherein those detected vessels that do not overlap are classified based on stain signals.

11. The non-transitory computer-readable medium of claim 1, wherein instructions are provided for estimating a maturity of a detected vessel, wherein the estimating of the maturity of a detected vessel comprises evaluating a difference in mean pixel intensities between inner and outer rings placed around the detected vessel, and wherein the inner and outer rings comprise pixels whose intensities correspond to signals of tissue stained with an anti-smooth muscle antibody.

12. A system for vessel identification and classification, comprising: (i) an image acquisition device, (ii) one or more processors, and (iii) a memory coupled to the processor, the memory to store computer-executable instructions that, when executed by the one or more processors, cause the one or more processors to perform operations comprising: detecting one or more vessels in each of a plurality of vessel channel images derived from a biological sample having one or more stains, wherein each of the one or more detected vessels are selected from a group consisting of large vessels, long and narrow vessels, and small vessels; classifying the detected one or more vessels as blood vessels or lymphatic vessels; and identifying a maturity of each of the one or more detected vessels.

13. The system of claim 12, wherein the image acquisition device is a multi-spectral imaging system.

14. The system of claim 12, wherein (a) the detection of large vessels comprises identifying lumens having low pixel intensity value inner regions surrounded by high pixel intensity value contours; (b) the detection of long and narrow vessels comprises (i) detecting local lines in a plurality of overlapping image regions in a vessel channel image; and (ii) grouping together the detected local lines from the overlapping image regions that meet an affinity threshold; and (c) the detection of small vessels comprises (i) generating a binary mask comprising pixels whose intensities are greater than surrounding background intensities;

(ii) connecting pixels within the generated binary mask; and (iii) evaluating whether a size of the connected pixels meets a small vessel threshold size.

15. A computer implemented method for detecting and analyzing vessels in a tissue sample stained with one or more stains, the method comprising: detecting one or more vessels in each of a plurality of vessel channel images, wherein each of the one or more detected vessels are selected from a group consisting of large vessels, long and narrow vessels, and small vessels; wherein the detecting of large vessels comprises identifying lumens having low pixel intensity value inner regions surrounded by high pixel intensity value contours; and wherein the detection of small vessels comprises (i) generating a binary mask comprising pixels whose intensities are greater than surrounding background intensities; (ii) connecting pixels within the generated binary mask; and (iii) evaluating whether a size of the connected pixels meets a small vessel threshold size; classifying the detected one or more vessels as blood vessels or lymphatic vessels; and identifying a maturity of each of the one or more identified vessels.

16. The computer implemented method of claim 15, wherein the identifying of lumens having low pixel intensity value inner regions surrounded by high pixel intensity value contours comprises evaluating contrasts between dark regions in the vessel channel images and comparatively lighter regions in the vessel channel images.

17. The computer implemented method of claim 15, wherein the detection of large vessels comprises detecting a boundary of the identified lumen by (a) placing a spoke at an approximate center of the identified lumen, each spoke having a plurality of arms extending radially from a center of the spoke, (b) evaluating pixel intensities along each arm and pixel intensities at the spoke center, (c) retaining the spoke meeting contrast threshold values; and (d) generating a contour polygon based on the retained spoke.

18. The computer implemented method of claim 15, wherein the detection of long and narrow vessels comprises (i) detecting local lines in a plurality of overlapping regions in a vessel channel image; and (ii) grouping together the detected local lines from the overlapping regions that meet an affinity threshold.

19. The computer implemented method of claim 18, wherein the grouping together of the detected local lines from the overlapping regions that meet the affinity threshold comprises (i) calculating an affinity between two adjacent local lines in the overlapping region by evaluating a distance and an angle between the two adjacent local lines, and (ii) comparing the calculated affinity to an affinity threshold.

20. The computer implemented method of claim 19, wherein a contour polygon is generated from the grouped lines.

21. The computer implemented method of claim 15, wherein the generation of the binary mask comprises (i) selecting pixels among a plurality of pixels; (ii) measuring a mean value of intensities of pixels surrounding each of the selected pixels; (iii) subtracting the respective measured mean value of intensities of pixels surrounding the selected pixels from an intensity value of each of the respective selected pixels; (iv) comparing the subtracted values to a background intensity threshold; and (v) adding those pixels whose subtracted value intensities exceed the background intensity to the binary mask.

22. The computer implemented method of claim 21, wherein the pixels within the generated binary mask are connected using a connected components labeling process.

23. The computer implemented method of claim 15, wherein the classifying of the detected one or more vessels comprises identifying overlapping vessels in each of the plurality of vessel channel images, and wherein those detected vessels that do not overlap are classified based on stain signals.

24. The computer implemented method of claim 15, wherein the method further comprises the step of estimating a maturity of a detected vessel, wherein the estimating of the maturity of a detected vessel comprises evaluating a difference in mean pixel intensities between inner and outer rings placed around the detected vessel, and wherein the inner and outer rings comprise pixels whose intensities correspond to signals of tissue stained with an anti-smooth muscle antibody.

25. The computer implemented method of claim 15, wherein the method further comprises the step of detecting nuclei.

* * * * *